(12) United States Patent
Sofman et al.

(10) Patent No.: US 10,874,952 B2
(45) Date of Patent: *Dec. 29, 2020

(54) VIRTUAL REPRESENTATION OF PHYSICAL AGENT

(71) Applicant: Digital Dream Labs, LLC, Pittsburgh, PA (US)

(72) Inventors: Boris Sofman, San Francisco, CA (US); Hanns Tappeiner, San Francisco, CA (US); Mark Matthew Palatucci, San Francisco, CA (US); Patrick Lee DeNeale, Oakland, CA (US)

(73) Assignee: Digital Dream Labs, LLC, Pittsburgh, PA (US)

( * ) Notice: Subject to any disclaimer, the term of this patent is extended or adjusted under 35 U.S.C. 154(b) by 131 days.

This patent is subject to a terminal disclaimer.

(21) Appl. No.: 15/880,401

(22) Filed: Jan. 25, 2018

(65) Prior Publication Data

US 2018/0154271 A1 Jun. 7, 2018

Related U.S. Application Data

(63) Continuation of application No. 14/843,591, filed on Sep. 2, 2015, now Pat. No. 9,919,232, which is a
(Continued)

(51) Int. Cl.
*A63H 30/02* (2006.01)
*B25J 9/16* (2006.01)
(Continued)

(52) U.S. Cl.
CPC ............ *A63H 30/02* (2013.01); *A63F 13/00* (2013.01); *A63F 13/30* (2014.09); *A63H 17/40* (2013.01);
(Continued)

(58) Field of Classification Search
CPC ........ A63H 30/02; A63H 33/04; A63H 30/04; A63H 18/16; A63H 17/40; A63H 33/046;
(Continued)

(56) References Cited

U.S. PATENT DOCUMENTS 4,307,791 A 12/1981 De Bruine
4,658,928 A 4/1987 Seo
(Continued)

FOREIGN PATENT DOCUMENTS

DE 19532540 3/1997
DE 202004018425 4/2006
(Continued)

OTHER PUBLICATIONS

Zlot, Robert et al., "Multi-Robot Exploration Controlled by a Market Economy", 2009 IEEE, 9 pages.

*Primary Examiner* — Jason Holloway
(74) *Attorney, Agent, or Firm* — David G. Oberdick

(57) ABSTRACT

A robotic system is integrated with one or more mobile computing devices. Physical configurations of individual components of the system in physical space, or agents, under control of a user or users, are duplicated in a representation in virtual space. Some degree of real-time parity is maintained between the physical and virtual spaces, so as to implement a virtual environment that mirrors the physical one. Events occurring within one environment can directly influence and bear consequence on the course of events occurring within the other environment. Elements of virtual space thereby become truly interdependent and unified on a peer footing with elements in physical space. In at least one embodiment, the system is implemented as an application in entertainment, such as the manifestation of a video game in physical space.

27 Claims, 6 Drawing Sheets

Related U.S. Application Data continuation of application No. 14/291,513, filed on May 30, 2014, now Pat. No. 9,155,961, which is a continuation-in-part of application No. 13/963,638, filed on Aug. 9, 2013, now Pat. No. 8,882,560, which is a continuation-in-part of application No. 13/707,512, filed on Dec. 6, 2012, now Pat. No. 8,747,182, which is a continuation-in-part of application No. 12/788,605, filed on May 27, 2010, now Pat. No. 8,353,737.

(60) Provisional application No. 61/829,419, filed on May 31, 2013, provisional application No. 61/693,687, filed on Aug. 27, 2012, provisional application No. 61/261,023, filed on Nov. 13, 2009, provisional application No. 61/181,719, filed on May 28, 2009.

(51) Int. Cl.
| | | |
|---|---|---|
| *G05D 1/00* | (2006.01) | |
| *B25J 9/08* | (2006.01) | |
| *A63H 33/04* | (2006.01) | |
| *A63H 30/04* | (2006.01) | |
| *A63H 17/40* | (2006.01) | |
| *A63H 18/16* | (2006.01) | |
| *A63F 13/30* | (2014.01) | |
| *A63F 13/00* | (2014.01) | |
| *A63H 17/32* | (2006.01) | |

(52) U.S. Cl.
CPC ............. *A63H 18/16* (2013.01); *A63H 30/04* (2013.01); *A63H 33/04* (2013.01); *B25J 9/08* (2013.01); *B25J 9/1617* (2013.01); *G05D 1/0088* (2013.01); *A63H 17/32* (2013.01); *A63H 33/042* (2013.01); *A63H 33/046* (2013.01); *G05B 2219/39146* (2013.01); *G05B 2219/40109* (2013.01); *G05B 2219/40302* (2013.01)

(58) Field of Classification Search
CPC ............ A63H 33/40302; A63H 33/042; A63H 17/32; A63F 13/30; A63F 13/00; B25J 9/08; B25J 9/1617; G05D 1/0088; G05B 2219/40109; G05B 2219/39146; G05B 2219/40302
See application file for complete search history.

(56) References Cited

U.S. PATENT DOCUMENTS

| | | | |
|---|---|---|---|
| 5,203,733 | A | 4/1993 | Patch et al. |
| 5,452,901 | A | 9/1995 | Nakada et al. |
| 5,697,829 | A | 12/1997 | Chainani et al. |
| 5,989,096 | A | 11/1999 | Barton et al. |
| 6,012,957 | A | 1/2000 | Cyrus et al. |
| 6,254,478 | B1 | 7/2001 | Namanny et al. |
| 6,491,566 | B2 | 12/2002 | Peters et al. |
| 6,636,781 | B1 | 10/2003 | Shen et al. |
| 6,695,668 | B2 | 2/2004 | Donahue et al. |
| 6,780,078 | B2 | 8/2004 | Hageman et al. |
| 6,783,425 | B2 | 8/2004 | McKeefery |
| 7,076,331 | B1 | 7/2006 | Nagatsuka et al. |
| 7,097,532 | B1 | 8/2006 | Rolicki et al. |
| 7,753,756 | B2 | 7/2010 | McDermott et al. |
| 8,013,550 | B1 | 9/2011 | Young et al. |
| 8,160,994 | B2 | 4/2012 | Ong et al. |
| 8,287,372 | B2 | 10/2012 | Hong et al. |
| 8,353,737 | B2 | 1/2013 | Sofman et al. |
| 8,845,385 | B2 | 9/2014 | Sofman et al. |
| 9,067,145 | B2 * | 6/2015 | Sofman .................. A63H 30/04 |
| 2002/0102910 | A1 | 8/2002 | Donahue et al. |
| 2002/0137427 | A1 | 9/2002 | Peters et al. |
| 2003/0060287 | A1 | 3/2003 | Nishiyama |
| 2003/0148698 | A1 | 8/2003 | Koenig |
| 2003/0232649 | A1 | 12/2003 | Gizis et al. |
| 2004/0068415 | A1 | 4/2004 | Solomon |
| 2004/0134336 | A1 | 7/2004 | Solomon |
| 2004/0134337 | A1 | 7/2004 | Solomon |
| 2004/0162638 | A1 | 8/2004 | Solomon |
| 2004/0176082 | A1 | 9/2004 | Cliff et al. |
| 2004/0266506 | A1 | 12/2004 | Herbrich et al. |
| 2005/0186884 | A1 | 8/2005 | Evans |
| 2006/0073760 | A1 | 4/2006 | Tremel et al. |
| 2006/0073761 | A1 | 4/2006 | Weiss et al. |
| 2006/0223637 | A1 | 10/2006 | Rosenberg |
| 2007/0017984 | A1 | 1/2007 | Mountz et al. |
| 2007/0021863 | A1 | 1/2007 | Mountz et al. |
| 2007/0021864 | A1 | 1/2007 | Mountz et al. |
| 2007/0173171 | A1 | 7/2007 | Pal Benedek et al. |
| 2007/0173177 | A1 | 7/2007 | Hirokawa |
| 2007/0293124 | A1 | 12/2007 | Smith et al. |
| 2008/0026671 | A1 | 1/2008 | Smith et al. |
| 2008/0195566 | A1 | 8/2008 | Lee et al. |
| 2009/0004948 | A1 | 1/2009 | Ando et al. |
| 2009/0076784 | A1 | 3/2009 | Ong et al. |
| 2009/0111356 | A1 | 4/2009 | Haass et al. |
| 2009/0284553 | A1 | 11/2009 | Seydoux |
| 2010/0093255 | A1 | 4/2010 | Yamamoto |
| 2010/0099493 | A1 | 4/2010 | Horovitz |
| 2010/0178966 | A1 | 7/2010 | Seydoux |
| 2010/0203933 | A1 | 8/2010 | Eyzaguirre et al. |
| 2010/0230198 | A1 | 9/2010 | Frank et al. |
| 2010/0304640 | A1 * | 12/2010 | Sofman .................. A63H 17/40 446/456 |
| 2012/0238366 | A1 | 9/2012 | Tedder |
| 2013/0095726 | A1 | 4/2013 | Sofman et al. |
| 2013/0190090 | A1 | 7/2013 | Lin |
| 2014/0017974 | A1 | 1/2014 | Sofman et al. |
| 2014/0235136 | A1 | 8/2014 | Sofman et al. |
| 2014/0235138 | A1 | 8/2014 | Sofman et al. |
| 2014/0342834 | A1 | 11/2014 | Tappeiner et al. |

FOREIGN PATENT DOCUMENTS

| | | |
|---|---|---|
| EP | 1103351 | 5/2001 |
| GB | 2385238 | 8/2003 |
| JP | 7016348 | 1/1995 |
| JP | 2001022264 | 1/2001 |
| JP | 2003346240 | 12/2002 |
| JP | 2005185655 | 7/2005 |
| KR | 100842566 | 7/2008 |
| WO | 2008039934 | 4/2008 |
| WO | 2009037677 | 3/2009 |
| WO | 2014194191 | 12/2014 |
| WO | 2015157517 | 10/2015 |
| WO | 2016111809 | 7/2016 |

\* cited by examiner

VIRTUAL REPRESENTATION OF PHYSICAL AGENT

CROSS-REFERENCE TO RELATED APPLICATION

The present application claims priority as a continuation of pending U.S. Utility application Ser. No. 14/843,591 for "Mobile Agents for Manipulating, Moving, and/or Reorienting Components", filed on Sep. 2, 2015, which is incorporated herein by reference.

U.S. Utility application Ser. No. 14/843,591 claims priority as a continuation of U.S. Utility application Ser. No. 14/291,513 for "Mobile Agents for Manipulating, Moving, and/or Reorienting Components", filed on May 30, 2014 and issued as U.S. Pat. No. 9,155,961 on Oct. 13, 2015, which is incorporated herein by reference.

U.S. Utility application Ser. No. 14/291,513 claims the benefit of U.S. Provisional Application Ser. No. 61/829,419 for "Mobile Agents for Constructing Generalized Structures", filed on May 31, 2013, which is incorporated herein by reference.

U.S. Utility application Ser. No. 14/291,513 also claims priority as a continuation-in part of U.S. Utility application Ser. No. 13/963,638 for "Integration of a Robotic System with One or More Mobile Computing Devices", filed on Aug. 9, 2013 and issued as U.S. Pat. No. 8,882,560 on Nov. 11, 2014, which is incorporated herein by reference.

U.S. Utility application Ser. No. 13/963,638 claims the benefit of U.S. Provisional Application Ser. No. 61/693,687 for "Integration of a Robotic System with One or More Mobile Computing Devices", filed on Aug. 27, 2012, which is incorporated herein by reference.

U.S. Utility application Ser. No. 13/963,638 also claims priority as a continuation-in-part of U.S. Utility application Ser. No. 13/707,512 for "Distributed System of Autonomously Controlled Mobile Agents", filed on Dec. 6, 2012 and issued as U.S. Pat. No. 8,747,182 on Jun. 10, 2014, which is incorporated herein by reference.

U.S. Utility application Ser. No. 13/707,512 claims priority as a continuation of U.S. Utility application Ser. No. 12/788,605 for "Distributed System of Autonomously Controlled Toy Vehicles", filed on May 27, 2010 and issued as U.S. Pat. No. 8,353,737 on Jan. 15, 2013, which is incorporated herein by reference.

U.S. Utility application Ser. No. 12/788,605 claims the benefit of U.S. Provisional Patent Application Nos. 61/181,719, filed on May 28, 2009, and 61/261,023, filed on Nov. 13, 2009, both of which are incorporated herein by reference.

FIELD

The present disclosure relates to robotic systems capable of being integrated with mobile computing devices.

BACKGROUND

One of the challenges of building robotic systems that are mobile, autonomous and/or otherwise able to operate with some level of cognizance regarding their environment is that costs can be significant. Producing such systems at a cost that can support sales to the consumer market has been an historic impediment to the deployment of robots for consumer use. While the market opportunity for imparting some level of intelligence or functional capability based around artificial intelligence to products is immense, the cost structure of these products, particularly commodity products, makes these additions prohibitive from a business standpoint.

A particular source of such expense is the use of dedicated hardware and firmware for such robotic systems, including control systems and autonomous components. Given the cost-competitive nature of commodity-based product markets, in particular those related to entertainment products, it can be unfeasible to produce and sell products for such robotic applications in a profitable manner.

SUMMARY

According to various embodiments, mobile computing devices such as smartphones and/or tablets are leveraged as a platform to support and control robotic systems. The rapid adoption of such devices among consumers has made it feasible and realistic to assume that a sufficient number of such devices are available for use by a consumer in connection with a robotic system.

By using mobile computing devices such as smartphones to support at least a part of the robotic system's operation, the techniques described herein afford significant potential reductions in the hardware requirements in the robotic system. Additionally, such devices generally have rich user interfaces, appreciable computational capacity, and built-in wireless connectivity, thus making them ideal for use as a robust control system for robotic systems as described herein.

According to various embodiments, a robotic system is integrated with one or more mobile computing devices. Such mobile computing devices may include, for example, one or more smartphones, tablet computers, laptop computers, gaming consoles, kiosks, and/or the like. In other embodiments, the techniques described herein can be implemented using any other suitable computing devices, such as desktop computers, web-based computing architectures, and/or the like. Such computing components can be networked with each other, and/or with physical components such as agents under control of a user or users; such networking can make use of Bluetooth, Wifi, and/or other wireless networking technologies.

In various embodiments as described herein, physical configurations of individual components of the system in physical space, or agents, under control of a user or users are duplicated in a representation in virtual space. Some degree of real-time parity can be maintained between the physical and virtual spaces, so as to implement a virtual environment that mirrors the physical one. In this manner, the described system supports a system in which events occurring within one environment can directly influence and bear consequence on the course of events occurring within the other environment. Elements of virtual space thereby become truly interdependent and unified on a peer footing with elements in physical space.

The integration of the virtual and physical have been the supposed tenants of augmented reality; applications of augmented reality to date have yielded numerous examples of one-directional influence (either the physical affecting the virtual, or vice-versa), but these have fallen short of constituting a robust bi-directional system. In at least one embodiment, a truly symbiotic system is implemented, wherein the virtual environment impacts the physical one in a coherent manner, and vice versa.

In at least one embodiment, the system is implemented as an application in entertainment, such as the manifestation of a video game in physical space. Games and entertainment are an appealing use of the described system for its inclusion of interactivity among multiple users. In at least one embodiment, the system provides an environment wherein users control one or more agents of the system, while one or more other agents may be controlled by artificial intelligence.

BRIEF DESCRIPTION OF THE DRAWINGS

The accompanying drawings illustrate several embodiments and, together with the description, serve to explain the principles of the described system according to the embodiments. One skilled in the art will recognize that the particular embodiments illustrated in the drawings are merely exemplary, and are not intended to limit scope.

DETAILED DESCRIPTION

For illustrative purposes, the system will be described herein primarily in the context of a system that implements a car racing game in which the agents under user control are physical vehicles or accessories related to gameplay, competing on a physical track. Further details regarding the implementation of such a system, and its mechanisms for integrating virtual and physical environments, are set forth in related U.S. Utility application Ser. No. 13/707,512 for "Distributed System of Autonomously Controlled Mobile Agents", filed on Dec. 6, 2012, and which is incorporated herein by reference. However, one skilled in the art will recognize that the techniques described herein can be implemented in other contexts and environments, and need not be limited to vehicles on a physical track. The term "vehicle" as used herein shall therefore be taken to extend to any movable agent that is capable of being controlled and operated in the manner described herein, while also being represented in a virtual environment as described herein.

Although the system is described herein primarily in the context of an application in entertainment, one skilled in the art will recognize that the described system can be implemented in many other contexts, including contexts that are not necessarily related to entertainment.

System Architecture

Figure 1:
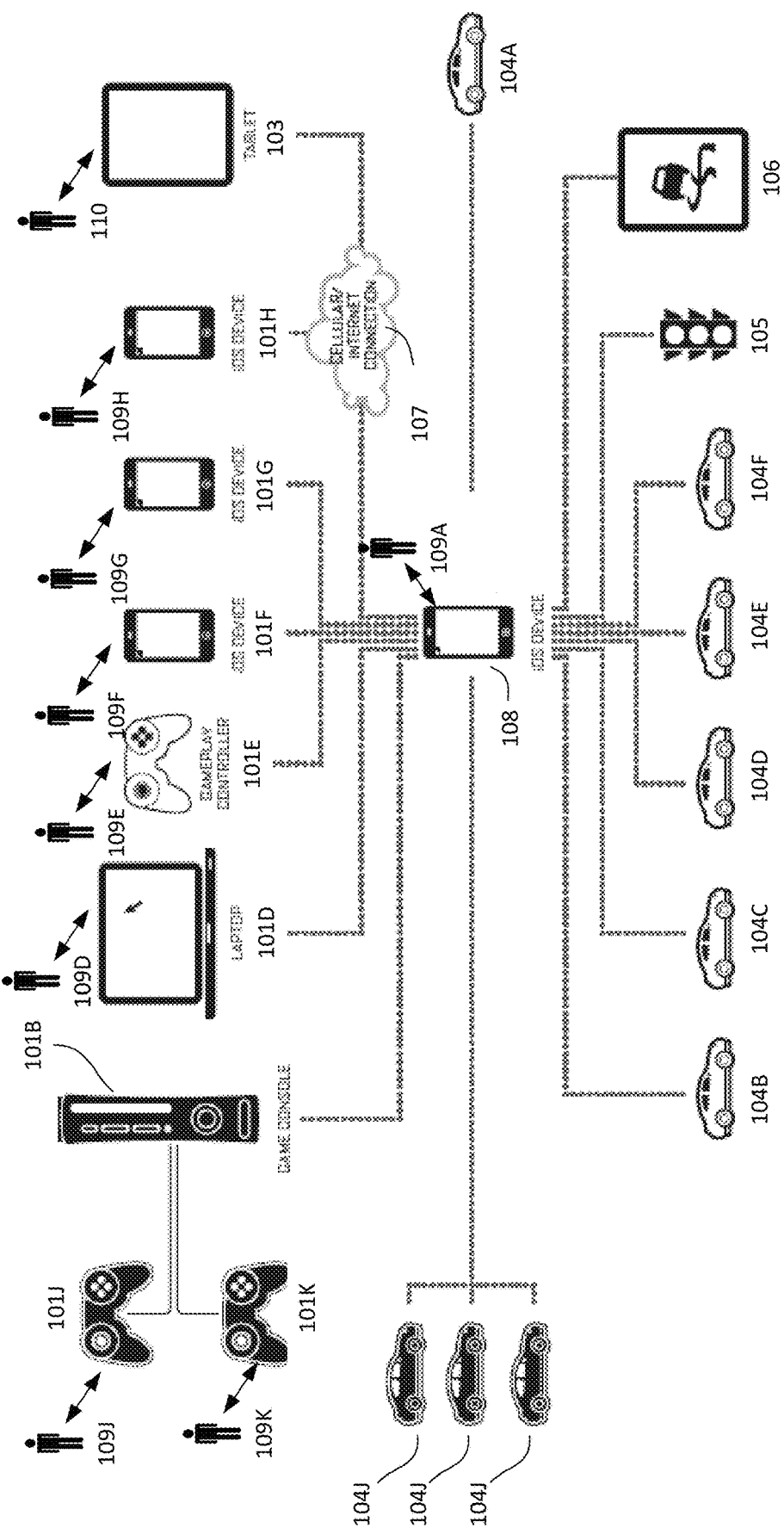
FIG. 1 is a block diagram depicting an architecture for implementing the system according to one embodiment.

Referring now to FIG. 1, there is shown an architecture for implementing the system according to one embodiment. In the system 100 depicted in FIG. 1, gameplay is hosted by a host device 108, which may be implemented on any suitable computing device, whether mobile or stationary, such as for example a smartphone, tablet, laptop computer, or the like, and/or any combination thereof. In at least one embodiment, host device 108 supports and runs various algorithms contained in software which implement game operations. Host device 108 and associated software are collectively referred to herein as a base station or central control unit.

Any of a variety of different devices can serve as host device 108; examples include smartphones, tablet computers, laptop computers, desktop computers, video game consoles, and/or any other computing device capable of supporting the control software for the system. In at least one embodiment, such a device can use any suitable operating system, including for example and without limitation: iOS or MacOS, available from Apple Inc. of Cupertino, Calif.; Android, available from Google, Inc. of Mountain View, Calif.; or Windows, available from Microsoft Corporation of Redmond, Wash. In at least one embodiment, host device 108 is an iPhone or iPad, available from Apple Inc. of Cupertino, Calif., running a suitable software application ("app"). In at least one embodiment, software for controlling host device 108 may be provided via any suitable means, such as a downloadable application ("app") that includes the appropriate functionality and gameplay structure to operate agents 104A through 104F in physical space and to plan, coordinate and execute gameplay according to rules, user-controlled actions, and/or artificial intelligence. In at least one embodiment, host device 108 maintains the state of agents 104A through 104F, and sends and receives commands to and from agents 104A through 104F. Host device 108 may also include a suitable user interface for facilitating user interaction with the system.

In at least one embodiment, agents 104A through 104F are mobile agents such as vehicles, and are referred to herein as such, although they may be other objects or components.

In at least one embodiment, host device 108 is the central node for all activity and control commands sent to agents 104A through 104F and/or other components such as accessories 105, 106, whether the commands originate from algorithms running on host device 108 or are routed through host device 108 but originate from control devices 101D through 101K controlled by users 109D through 109K who are physically present or remotely located. In other embodiments, a more distributed architecture may be implemented wherein host device 108 need not be the central node for all activity and control commands.

The example shown in FIG. 1 includes a specific number of controllers 101D through 101K, agents 104B through 104H, accessories 105, 106 (which may also be considered a type of agent), AI-controlled vehicles 104J (which may also be considered a type of agent), and other components. One skilled in the art will recognize that the particular quantities of these components depicted in FIG. 1 and described herein are merely exemplary, and that the system can be implemented using any other quantities, and/or with some of the components being omitted if appropriate.

In the architecture of FIG. 1, system 100 is implemented in a centralized manner, wherein controllers 101D through 101K and agents (including vehicles 104A through 104F), along with other components, communicate with host device 108. As depicted, in at least one embodiment, multiple users 109 (or players) can control multiple agents in the form of vehicles 104A through 104F, while other agents/vehicles 104J may be controlled by means of artificial intelligence.

As shown in FIG. 1, any number of external devices may be connected to host device 108 via any suitable communications protocol, such as for example a cellular/Internet connection 107. The various external devices may or may not be identical to host device 108. Some or all of the external devices serve as player controllers. FIG. 1 depicts various examples of devices that can be used as player controllers, including: game console 101B with any number of controllers 101J, 101K (controlled by users 109J, 109K, respectively): laptop computer 101D (controlled by user 109D); stand-alone controller 101E (controlled by user 109E); and smartphones 101F, 101G, and 101H (controlled by users 109F, 109G, and 109H, respectively). In at least one embodiment, any or all of controllers 101 can be an iPhone or iPad, available from Apple Inc. of Cupertino, Calif., running a suitable software application ("app"). Controllers 101J, 101K, 101E can be of any suitable type, including for example controllers that are commonly used with console game devices.

In the embodiment depicted in FIG. 1, a game is hosted on host device 108. Host device 108 supports gameplay in physical space in a physical environment (such as a race track) as well as in a virtual environment under the direction of software; the state of the virtual environment is maintained in memory on host device 108 and/or elsewhere.

Figure 6:
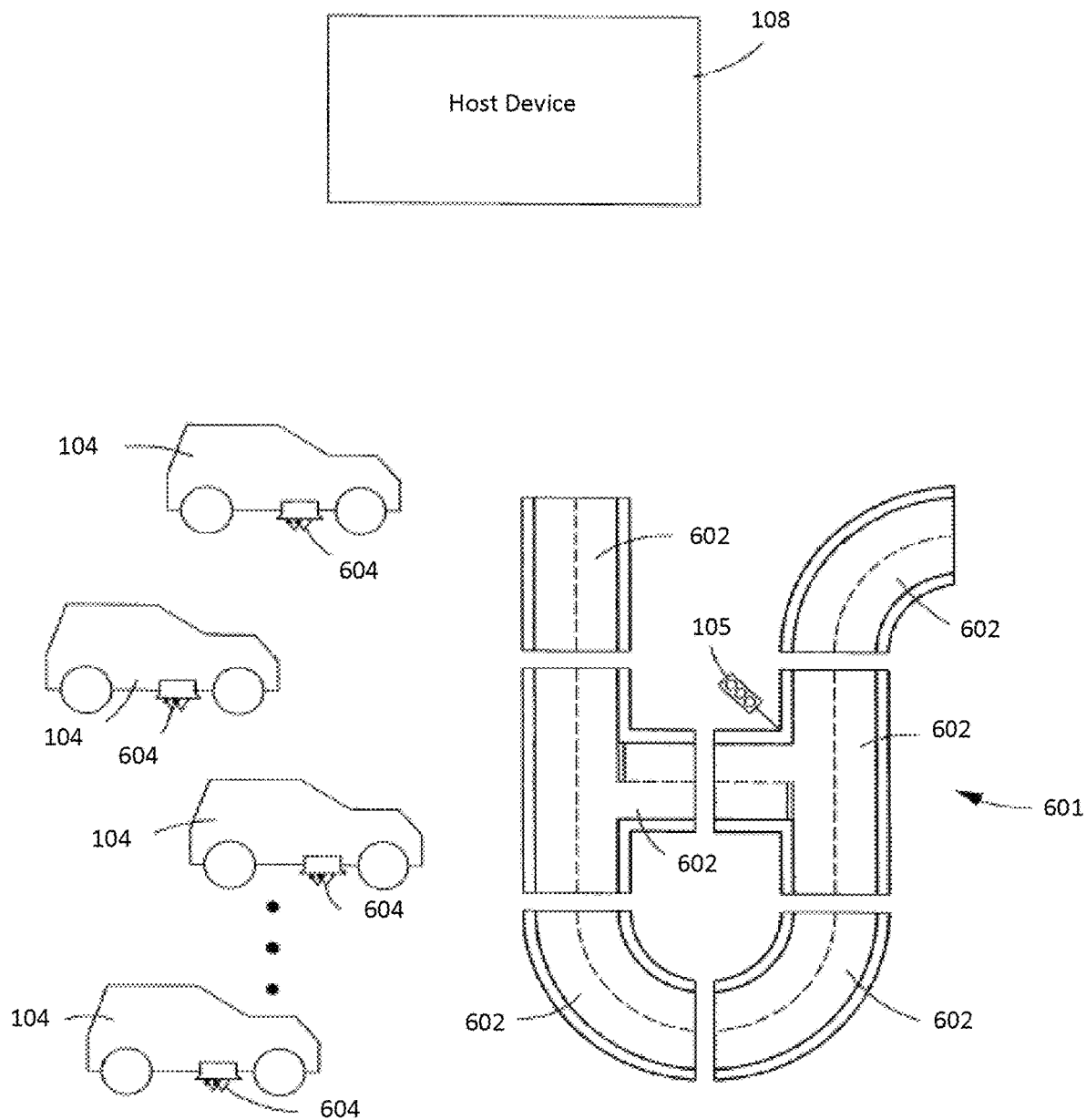
FIG. 6 depicts an example of an embodiment for implementing a gameplay environment wherein vehicles race on a race track, according to one embodiment.

Referring now also to FIG. 6, there is shown an example of an embodiment for implementing a gameplay environment wherein vehicles 104 (race cars) race on a drivable surface 601 (such as a race track), according to one embodiment. One skilled in the art will recognize, however, that such an embodiment is merely one example of an implementation; for example, the system can be implemented in an entirely different physical environment, with agents other than vehicles, and/or with different types of tracks or no track at all.

As described in related U.S. Utility application Ser. No. 13/707,512 for "Distributed System of Autonomously Controlled Mobile Agents", drivable surface 601 is, in at least one embodiment, a physical model of one or more roads, and can include objects such as stop signs, traffic lights 105, railroad crossings, and/or the like. Vehicles 104 are mobile agents capable of independent motion. Vehicles 104 can be physically modeled after cars, trucks, ambulances, animals, or any other desired form. In at least one embodiment, each vehicle includes one or more sensors 604 that can read information from drivable surface 601 and a communication module (not shown) that can send and receive commands and/or other information to/from host device 108, for example via wireless means.

As shown in FIG. 6, drivable surface 601 can include any number of segments 602, although such a segmented arrangement is optional. Such segments 602 may connect at specified connection points and can be reconfigured to construct any desired structure. This structure is referred to as drivable surface 601. Road segments 602 include continuous regions that one or more vehicles 104 can navigate called drivable sections and connect to each other end-to-end using a simple click-in mechanism present at each connection point. Each road segment 602 can also optionally transmit power to an adjacent road piece 602 and can optionally include a microcontroller for advanced functionality, such as traffic lights 603 and the like. Drivable surface 601 can also be provided as a single piece. Drivable surface 601 (and/or segments 602) can be foldable, collapsible, rollable, or otherwise able to be made compact for storage.

In at least one embodiment, base station software, running on host device 108, operates a virtual version of the physical game that continuously maintains parity with events in the physical environment by updating stored information relating to vehicle 104 position, direction, velocity and other aspects characterizing game events. In at least one embodiment, host device 108 ensures that at any point in time the game states in the physical environment and the virtual environment are identical (or substantially identical), or at least that the game state in the virtual environment is a representation of the physical state to at least a sufficient degree of accuracy for gameplay purposes.

In at least one embodiment, artificial intelligence software runs on host device 108 and issues commands (via wireless communication mechanisms or other mechanisms) to control one or more vehicles 104J operating on track 601. In other embodiments, software for controlling vehicles 104J may be located elsewhere, and/or may run on vehicles 104J themselves.

In at least one embodiment, host device 108 can simultaneously serve as a control unit for a human user 109A controlling a vehicle 104 (in the depicted example, human user 109A uses host device 108 to control vehicle 104A). Such functionality can be provided on host device 108 while host device 108 also serves as a conduit and interpreter for control commands incoming from other devices 101D through 101K controlling other vehicles 104B through 104F. In another embodiment, host device 108 does not serve as a control unit for a human user 109, but rather operates as a dedicated central control unit.

In at least one embodiment, agents (such as vehicles 104B through 104F) under user control do not need to be consistent in form or function. For example, users 109 may be given the opportunity to control objects or elements other than vehicles (such as traffic lights, railway crossings, gun turrets, drawbridges, pedestrians, and/or the like).

Player controllers 101D through 101K may communicate directly with host device 108 or they may communicate via intermediary devices. For example, in FIG. 1, controllers 101J and 101K communicate with host device 108 via game console 101B. Similarly, any number of tiers of connections can be configured between player controllers and the host device, such as one or more smartphones connecting to the host device through a succession of devices networked back to the host device.

FIG. 1 depicts an example in which vehicles 104B through 104F are controlled by human users 109B through 109F, respectively. Additional agents, referred to as accessories 105, 106, may also be controlled by human users 109, or they may operate automatically (for example, under the direction of artificial intelligence software running at host device 108 or elsewhere). Each accessory 105, 106 may be a physical or virtual item that can be powered or passive, and that can be used to affect aspects of the gameplay environment and/or other agents 104 directly. In this example, accessory 105 is a physical traffic light such as shown in FIG. 6. Other examples of physical accessories can be barriers, crossing gates, drawbridges, and/or the like; such devices can be communicatively coupled to host device 108 so as to control their operation in connection with gameplay. In at least one embodiment, a user 109 can change the physical state of accessory 105 and thereby influence gameplay.

Smart accessories 105 can also exist as passive elements in physical space. An example of a passive smart accessory is a decal intended to represent a potential hazard on drivable surface 601 placed in an arbitrary location at some point before or during play. Such a decal can contain an encoding scheme that permits its unique identification by vehicles 104 (as they pass over it, for instance). In at least one embodiment, a user 109 in control of one or more such passive smart accessories can selectively activate or deactivate the accessories individually or in groups. While passive in the physical environment, in the virtual environment such accessories can represent a range of different features such as, for example:

oil slicks that can suspend steering and braking of vehicles that pass over them;

landmines;

nails;

power-ups that boost performance of the first vehicle 104 to pass over them physically once they have been activated.

Even though passive accessories 105 may not necessarily indicate a state change in a physical way, host device 108 can report changes in virtual state, and can transmit such changes to users 109, via controllers 101, in real time. Behavior of vehicles 104 may also change in response to changes in virtual state of accessories 105.

Figure 5:
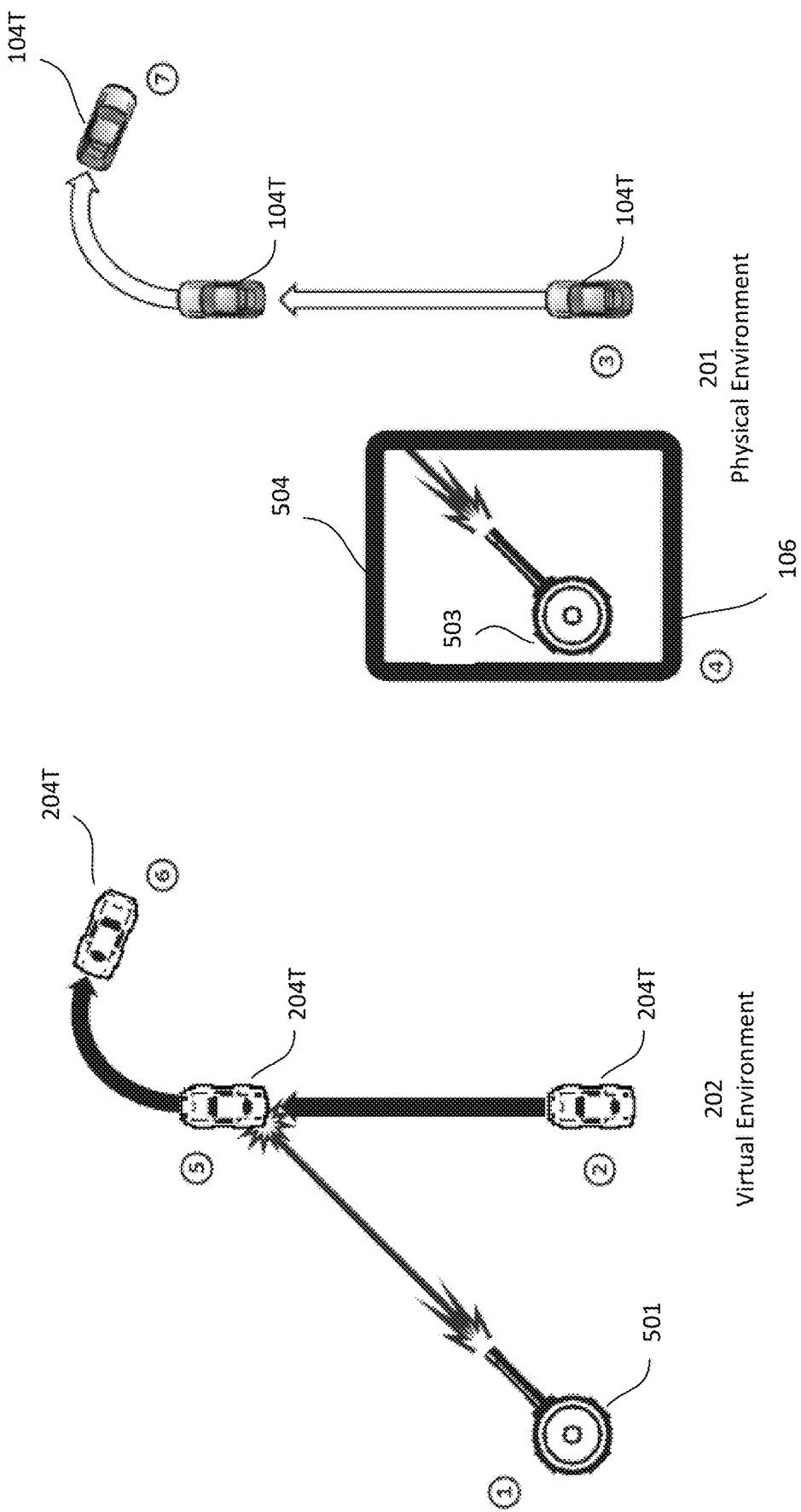
FIG. 5 depicts an example of the use of a virtual accessory to implement a digitally rendered element within a physical space, according to one embodiment.

Accessory 106 is an example of a virtual accessory, which has no physical component other than a computing device (such as a smartphone or tablet computer or the like) with an appropriate output device (such as a display screen). Virtual accessory 106 can be physically placed at a particular location in the physical game environment to render the accessory appropriately in both appearance and state. Referring now to FIG. 5, there is shown an example of a virtual accessory (tablet 106) that implements a digitally rendered element (an image 503 of a gun turret) within a physical space, according to one embodiment. Image 503 can move and animate so that it appears to interact with physical vehicles 104 in the gameplay area; for example, it can be made to appear to shoot physical vehicle 104, and physical vehicle 104 can be made to react as though it has been shot. These behaviors and interactions mirror the virtual environment, as also shown in FIG. 5, in which turret 501 is shooting at virtual representation 502 of vehicle 104. In various embodiments, accessories 105, 106 need not rely on a human user for operation but can operate under the control of artificial intelligence software running on host device 108 and/or elsewhere.

It can be appreciated by one skilled in the art that as the number of users 109 and the number of AI-controlled opponents likewise increases, the performance demands on host device 108 likewise increases. Depending on the number of agents 104 and the capacity of host device 108, the increases in computational requirements, for example, can impact game performance. In at least one embodiment, the system is implemented in a distributed environment, wherein, for example, host device 108 has the capacity to distribute portions of its logic to any number of devices to which it is connected and which are capable of supporting execution of said logic. Examples of these include smartphones, tablet computers, laptops, game consoles, and/or the like, but can also be any suitable devices capable of providing the necessary support to run the logic assigned to it. In at least one embodiment, for example, some of the processing tasks associated with operating system 100 can be distributed to one or more controllers 101D through 101H.

It is not necessary that the distribution remain local; in at least one embodiment; logic can be distributed to, for instance, one or more remotely located servers. A modular design to the structure of host device 108 can lend itself to convenient distribution of logic, and the type of logic processes offloaded from host device 108 need not be of one particular type of function or process. In at least one embodiment, for example, the distribution of logic can be prioritized according to computational and memory demand, such that those most taxing of host device's 108 resources are the first to be allocated elsewhere.

It is not necessary that the wireless interface employed to communicate with and/or among controllers 101D through 101H be identical to that used to connect to agents 104A through 104F under the users' 109 control. For example, it is possible that host device 108 communicates with controllers 101D through 101H via Wi-Fi, while host device 108 communicates with agents 104A through 104F via Bluetooth. In such a case, host device 108 can serve as a bridge between a high-power protocol (such as Wi-Fi) and a low-power protocol (such as Bluetooth). The advantage of such an approach can be appreciated in instances in which vehicles 104 controlled by users 109 via host device 108 or controlled directly by host device 108 (in the case of vehicles 104J under AI control) have limited power budgets.

Another benefit afforded by the use of Bluetooth, in particular Bluetooth Low Energy (BTLE or BLE) or similarly capable wireless protocol, is that agents 104 can use the wireless protocol to communicate with similarly enabled BTLE/wireless devices. In one embodiment, for example, a user 109 wishing to assume control of a particular vehicle 104 or active smart accessory 105 can bring the intended controller 101 (e.g., a BTLE-equipped smartphone) in proximity to the desired vehicle 104. Leveraging BTLE's capability of determining relative distance or proximity to another BTLE-enabled device, a user 109 can bring two BTLE-equipped devices within a threshold range of distance. In at least one embodiment, this can prompt a data exchange between the smartphone (e.g., 101F) and vehicle 104, presenting the user 109 with the option of selecting vehicle 104 for play. The selection is subsequently relayed to host device 108 indicating the pairing between vehicle 104 and the user's 109 smartphone 101, now designated as vehicle's 104 control device.

In various embodiments, BTLE data exchanges among vehicles 104 and/or similarly wirelessly-enabled agents can be used in other ways. For example, users or observers can receive information about the status of an agent 104 with respect to gameplay, overall lifetime usage, and/or historic achievements, and/or they can perform diagnostics or customize the unit.

As described above, controllers 101D through 101H can be implemented using any suitable devices. Again, less sophisticated controllers 101J, 101K can be used, such as wireless gamepads or joysticks. In instances in which a gamepad or joystick 101J, 101K is used which is not equipped with a wireless communication module supporting direct communication with host device 108, the connection to host device 108 can be achieved through a game console 101B or other intermediary, or through the use of a dongle (not shown) that plugs into an appropriate port on host device 108. Such a dongle links wirelessly to controller 101 and passes communications through the port into which it is plugged. Alternative embodiments of the dongle can include units that implement a bridge between a wireless protocol compatible with controller 101 and a wireless protocol compatible with host device 108.

In addition to passing users' 109 commands through host device 108 to vehicles 104B through 104F, controllers 101D through 101H can also receive updates from host device 108 that reflect the current state of the game. In at least one embodiment, some or all controllers 101D through 101H can be equipped with one or more output devices (such as a display, speaker, haptic output mechanisms, and/or the like), so as to be able to enhance the play experience based on such received state information. Such enhancements can include, for example, renderings, haptic output (e.g., vibration) and/or audio representing action on the game track and/or augmenting such action to increase the sense of realism or provide details otherwise not visible to a user 109.

In at least one embodiment, the visual, haptic, and/or audio information presented to users 109 through some or all controllers 101D through 101H can be unique to each device. Various agents 104 may be in different states at any given time (with respect to, for example, position, speed, status, action, and the like); in addition, in the case of multiple users 109 controlling a single agent 104, user roles or control may be different. Therefore, the various cues and data presented to each user 109 can be tailored to the current state of the agent 104 and the user's 109 particular role. For example, in at least one embodiment, a racing game might present renderings of the race course from the perspective of the vehicle 104 while displaying vehicle-specific data to the user 109. In an embodiment in which more than one user 109 may share control of a single agent 104, such as a vehicle equipped with a weapon in which one user 109 assumes the role of driver while the operates the weapon, it may be appropriate that the various forms of information transmitted to controllers 101 would differ in one or more aspects for each user 109 associated with said agent 104.

In various embodiments, users of controllers 101D through 101H may be physically present, so that controllers 101D through 101H communicate directly (via wireless protocol such as Bluetooth) with host device 108. Alternatively, users of controllers 101D through 101H may be remotely located and connected via a host network (such as network 107). Controllers 101D through 101H may rely on information reported back from host device 108 regarding game status.

In at least one embodiment, the tight coupling and parity maintenance between the states of the virtual play environment and the physical play environment enable users 109 to control vehicles 104 on a remotely located track 601. Such an architecture allows users who are not locally present to participate through reliance on the virtual representation of the game. In at least one embodiment, remote users 109 may have the same degree of control of their vehicles 104 as do local users 109, and they may have a view of events that is functionally identical to that of local users 109.

In at least one embodiment, spectators can observe game events from a remote location by making use of an external network connection. In the example of FIG. 1, a spectator, or observer 110, observes game events via tablet 103 that communicates via cellular/Internet connection 107 with host device 108. Because the action occurring in physical space is mirrored in real-time within the virtual environment, tablet 103 (or any other device used to display gameplay activity) can provide rich renderings and additional information regarding users 109, status and other details of potential interest to observer 110, as gameplay events are happening in physical space.

In at least one embodiment, a remote user 109 (or even a local one) can additionally use an auxiliary device (not shown) to display the game separate from the controller 101 he or she is using to control a physical agent 104. For example, if the remote user's controller 101 has a small screen, it may be useful to have such an auxiliary device for use as a second screen, thus providing a more complete and immersive game experience. For example, user-specific information can be displayed on one display (such as the display on controller 101), while a visualization of gameplay may be shown on the auxiliary display. Using a separate device or devices as a monitor can alleviate potential display limitations and provide an experience more familiar to console gamers who are accustomed to using a hand-held gamepad to control action that they watch on a separate screen.

While the examples discussed herein describe reliance on rendering or other representation of gameplay in virtual space, it is entirely possible to reproduce the gameplay in physical space in real-time on a duplicate physical track. Since parity is maintained between the virtual and physical, a remote user 109 can directly recreate play on a physical track that sufficiently matches the physical track 601 hosting the gameplay via mirroring the state of the virtual model. Wireless communication between host device 108 and a controller for the duplicate physical track can be used to cause vehicles on the duplicate track to move and behave in a manner that duplicates (or at least approximates) the action.

Host device 108 and/or other components may provide additional functionality. For example, one or more controller(s) 101 can provide supplemental information related to events occurring in the game, and/or can serve as a direct platform for additional gameplay. Such a device may have any suitable components to provide a desired level of interactivity, including for example:

a user interface which may be responsive to touch, button control, orientation relative to cardinal directions or device tilt/acceleration, and/or any other suitable user input;

a display screen;

one or more audio components such as speakers and microphone.

One skilled in the art will recognize that the above list is exemplary and not exhaustive.

One set of such enhancements may be collectively termed non-actionable information. These include, for example, audio, video, and/or haptic output, separately or in any suitable combination. Specific types of output may include, for example, sound effects, music, vibrations, images, animations, film clips, and/or the like. Any of these can be used, singly or in any suitable combination, to improve the sense of realism or otherwise enrich the sensory aspects of the game experience. Alternatively, these enhancements can assume the form of data that provides summary or supplemental information regarding aspects of the game and/or its users 109 such as car performance data, racer rankings by time, competitive standings, and/or other data.

In at least one embodiment, highly interactive game controllers 101 such as smartphones and tablets can be used to provide improvement to the game experience by leveraging the control and connective capabilities that these devices afford to create play scenarios outside the direct action occurring in the physical environment, and/or to permit modifications to aspects of the game or agents operating within it, whether during a game or outside gameplay. In the context of a racing game, for example, a vehicle 104 may pull into a pit stop on the physical racetrack; gameplay may then switch to controller 101 where a user 109 faces a challenge of servicing vehicle 104 as a member of the pit crew in an entirely digitally context more akin to a conventional video game format. As another example, a vehicle 104 can drive to a particular point in physical space, such as a building located on a play set, at which point the gameplay switches to the display on the game controller where the vehicle 104 driver's or team's exploits continue inside the building in a digitally rendered environment. Such examples describe scenarios in which gameplay can switch seamlessly between a physical play environment and a digital one. The digital environment can be supported by a highly interactive controller 101 and/or a controller 101 complemented by a separate display console (not shown) that communicates with controller 101 and/or with host device 108. In such scenarios, the integration of portions or segments of gameplay that occur in a purely digital space like that of a traditional video game into the overall system does not imply that these parts of experience are necessarily disconnected from the physical arena or have no impact on them. Considering the example of a user 109 causing a physical vehicle 104 to drive to a location that provides access to a digital portion of play, such as a pit stop, user 109 may no longer be actively controlling physical vehicle 104, but the digital space may provide opportunities to equip or repair vehicle 104 and thereby affect vehicle's 104 performance once user 109 resumes control of it. Other examples might include a user 109 similarly entering a purely digital environment that affords control of physical accessories such as a drawbridge on the race course, which enables user 109 to open and close a track section 602 to traffic in the physical environment from within a purely digital space. Likewise, such control can also be provided for virtual accessories 106, such as those hosted by an Android- or iOS-based device played in the physical play environment, which interact with physical agents 104 and/or affect their behavior.

In at least one embodiment wherein the described system is implemented as a competitive racing game, a controller 101 may provide functionality for manipulating a vehicle's 104 speed and steering. Making greater use of the capacity of a smartphone or similarly capable device as controller 101, however, could enable broader game controls. For example, in a "death race" scenario, vehicles 104 can be equipped with weapons that can be directed at competing vehicles 104. In such an embodiment, a highly interactive controller 101 can be used to support functions beyond basic vehicle speed and steering. Additional functions can be provided, such as for example aiming weapons mounted on a vehicle 104 or selecting a target vehicle 104 among an active representation of all vehicles 104 racing on drivable surface 601.

As mentioned above, in at least one embodiment, multiple users 109 can control a single agent 104 in a game. For example, in a racing game embodiment, three users 109 might control a single vehicle 104 in which one user 109 is providing steering and speed control, another user 109 aims and shoots a front-facing gun, and a third user 109 operates a rear-facing gun. In such a scenario, controllers 101 provide information tailored to the role filled by each user 109. For example, the user 109 driving vehicle 104 might find the display information and control schemes similar to those of a typical racing game, while the users 109 operating the guns might see a rendered view of the physical play environment in which the displayed perspective is from a position on vehicle 104 and includes virtual representations of track elements and competing vehicles 104 in locations and on trajectories relative to their actual positions in the physical play environment.

For the users 109 operating weapons in this example, the resulting control and interactive experience the smart device affords would be similar to a first-person shooter game.

The guns need not be (but may be) represented by any physical structure or element on physical vehicles 104 themselves; rather, they may be represented in the virtual environment instead of (or in addition to) having such physical structure. In at least one embodiment, when a gun is fired, a rendering of such firing may be presented in the virtual environment, and optionally physical vehicles 104 may provide some visual and/or auditory indications of such weapons activation (such as flashing lights, movement of physical gun barrels, sounds, and/or the like). The target of the gunfire (e.g. another vehicle 104) may respond as if hit, for example by changing its course, flipping over, becoming disabled, and/or the like; visual feedback may be provided in the virtual and/or physical environments, for example by the target emitting lights that make it appear as though it is in flames or otherwise disabled. LEDs or other visual and/or auditory components can be installed on vehicles 104 to provide the muzzle flash and sounds recreating the noise of a machine gun; such output can be synchronized with the firing of the corresponding gun in virtual space.

In at least one embodiment, vehicles 104 may be designed to exhibit (simulated) damage in physical space. For example, an LED can indicate that a vehicle 104 is sustaining damage, or the change in color of an LED array can indicate a vehicle's 104 current damage status. In at least one other embodiment, more complex approaches may be used to replicate or simulate the damage incurred to a vehicle 104 whether through weapon strikes, impacts or other means. These may include parts that fall away from the vehicle 104 or mechanisms that, when triggered, impart kinetic energy such as might be the result of collision or explosive forces acting on the vehicle 104. In at least one embodiment, vehicles 104 exhibit simulated damage by changing their behavior, for example to simulate a flat tire, damaged steering or engine components, or the like.

Bi-Directional Influence Between Physical and Virtual Environments

Figure 2:
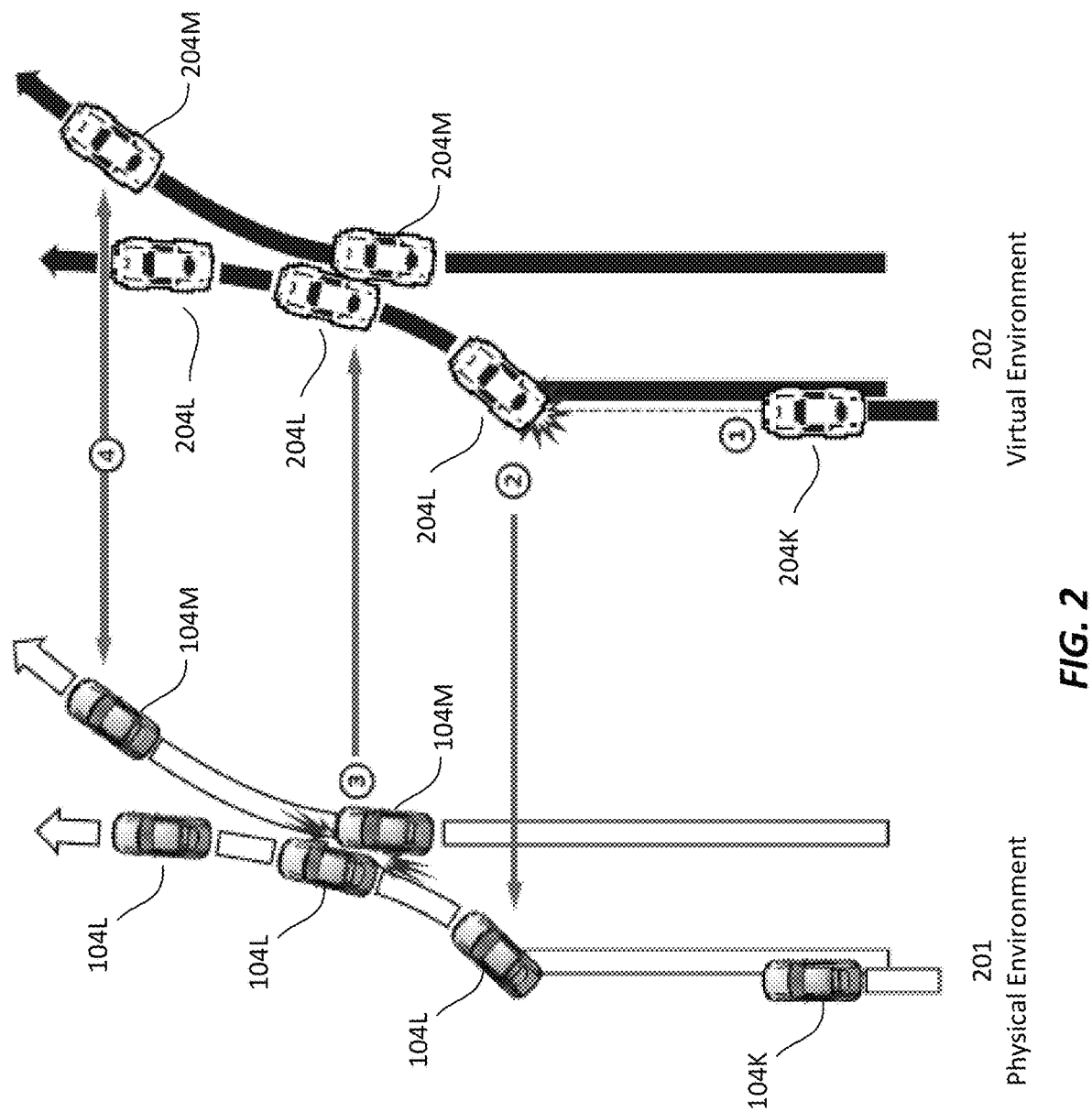
FIG. 2 depicts an example of integration of events and functions in physical and virtual space, according to one embodiment.

In at least one embodiment, the system maintains parity in a game space that occurs simultaneously in virtual and physical space by reconciling events at a low level, so as to permit bi-directional influence between the physical and the virtual environments. Referring now to FIG. 2, there is shown an example of such integration of events and functions in both physical space and virtual space. In this example, a racing game is implemented in which the mobile agents are vehicles competing in physical space; the vehicles are also equipped with virtual weapons.

The Figure depicts a series of events that involve virtual events impacting physical ones and vice versa. While the cars are racing on a physical course, the base station maintains a virtual representation of the race state in real time, so that the position, velocity, acceleration, course and other metrics characteristic of moving vehicles are continuously tracked in a re-creation in memory that mirrors the changing state of the physical world. In such a scenario, the virtual representations of the vehicles may have a number of functionalities or characteristics that are not present on the physical cars. One example is a gun that a user 109 can use to shoot at other vehicles in virtual space, but which does not exist in physical space. Because the virtual states and physical states are tightly coupled, events happening in one can affect the state of the other.

The series of events portrayed in the example of FIG. 2 take place as follows. Vehicle 104K is represented in virtual environment 202 by vehicle representation 204K. In virtual environment 202, vehicle representation 204K shoots a virtual gun at vehicle representation 204L, which represents vehicle 104L in physical environment 201. While vehicle 104K in physical environment 201 may have no actual gun that discharges a projectile, host device 108 operating the game may determine that, given the relative positions of the vehicle representations 204K, 204L, as well as the orientation of the gun, physics would yield a strike on vehicle representation 204L at position 2 in the Figure. Host device 108 also determines that the strike and resulting virtual energy imparted on impact displaces target vehicle representation 204L from its course in virtual environment 202.

As described above, in at least one embodiment the system maintains parity between the virtual and physical environments. Thus, in response to the above-described weapons strike on vehicle representation 204L, control algorithms of host device 108 recreate the virtual displacement of vehicle representation 204L in physical environment 201. Thus, physical vehicle 104L is artificially propelled to move in a manner that mimics the displacement of vehicle representation 204L in virtual environment 202. In the example of FIG. 2, physical vehicle 104L, having been struck by a virtual weapon at position 2, is artificially deflected from its current course in physical space. This results in a collision in physical space with another vehicle 104M at position 3.

The impact between physical vehicles 104L and 104M at position 3 involves a transfer of real energy that physically displaces vehicle 104M off its original course vector as shown at position 4. Upon detection of this change of course in physical environment 201, host device 108 causes virtual environment 202 to be correspondingly adjusted so that vehicle representations 204L and 204M continue to mirror the motion of vehicles 104L and 104M in physical environment 201. Thus, vehicle representation 204M is made to veer off course in an identical fashion.

In this manner, a chain of events in alternating states takes place, wherein occurrences in virtual environment 202 have consequences in physical environment 201, and the resulting effects in physical environment 201 in turn impact the dynamics or sequence of events in virtual environment 202. The above-described scenario exemplifies the tightly coupled nature of the physical and virtual environments 201, 202 in the system. Rather than merely connecting virtual components with physical ones, various embodiments are truly symbiotic and bi-directional, such that events and changes occurring in one state (environment) can influence events and changes happening in the other.

In at least one embodiment, the system does not necessarily maintain a precise balance of mutual influence across states, but can also be set to maintain a preferred dominant state. For example, in at least one embodiment, the system can be configured so that virtual environment 202 dominates physical environment 201, and physical environment 201 simply mirrors the events occurring in virtual environment 202; in at least one embodiment, the opposite configuration may be implemented. Any appropriate priority scheme can be established between the physical and virtual environments 201, 202.

In at least one embodiment, the system provides further advantages through the use of a controller 101 and/or host device 108 that has the capacity to connect to external server networks (not shown), thus providing an improved user experience. In at least one embodiment, a user 109 controlling one or more agents 104 via controller(s) 101 can download virtual goods for use in the game, and/or can download digital content such as sound effects or light pattern sequences for LEDs active on the agents. Any suitable virtual accessories or digital content can be made available via any suitable e-commerce mechanism such as the downloading of apps and/or resources. Such content can be made available for download via remote servers or installation through other means that enable users to tailor or improve their experiences. In at least one embodiment, any of a variety of aspects of the game experience can be modified or augmented through such methods, including, for example, personalities for AI-controlled vehicles, new commentators, new scenarios for existing race courses, content schemes for rendering events occurring in virtual space, and/or customizations and enhancements of the vehicles.

In addition to the communication with player controllers 101 and agents 104, in at least one embodiment host device 108 reconciles commands from users 109 with the operating framework of the game, and also reconciles events occurring in virtual environment 202 with those occurring in physical environment 201 involving physical agents 104.

Figure 3:
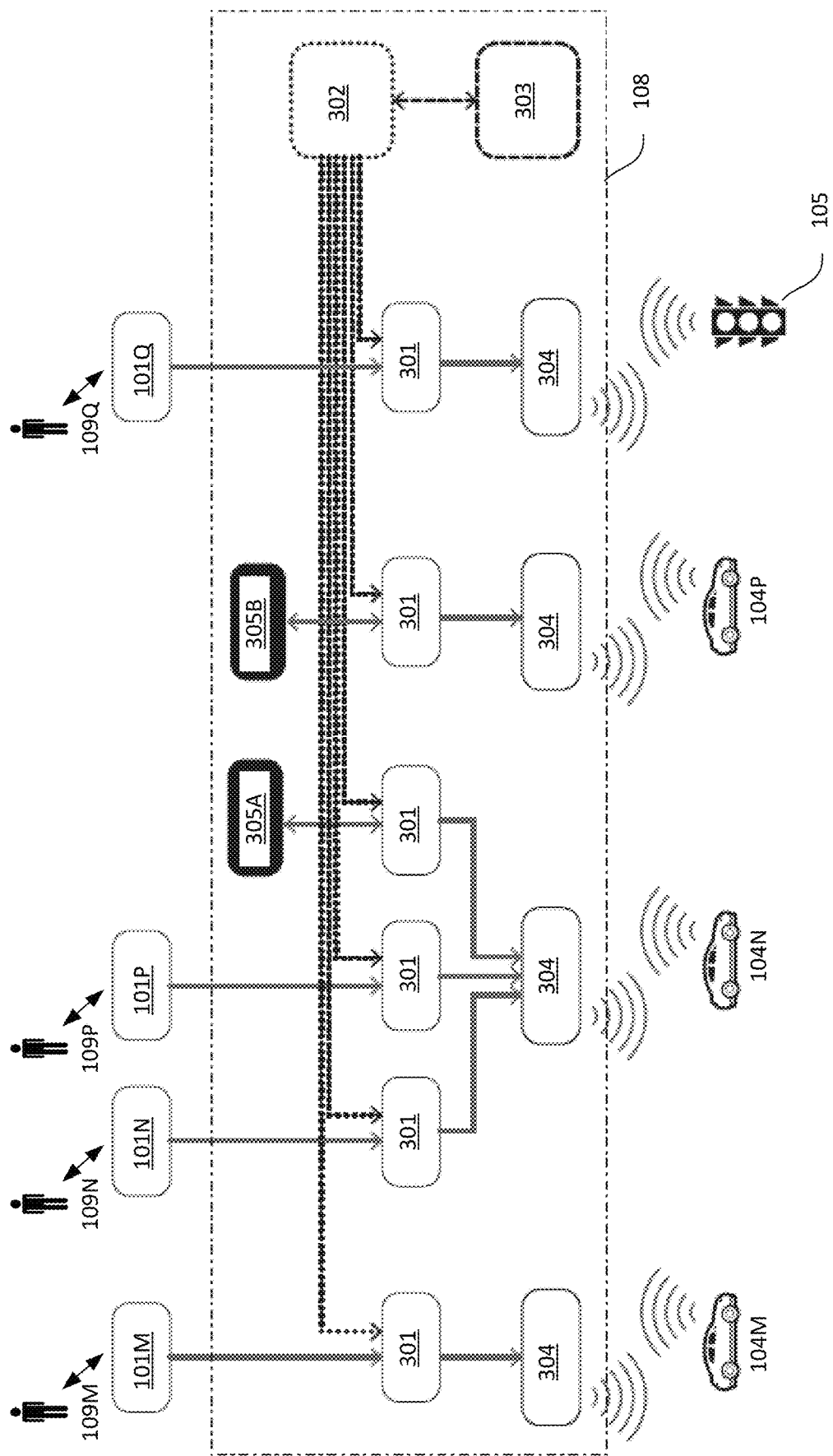
FIG. 3 is a block diagram depicting aspects of the role of the host device (base station) according to at least one embodiment, and illustrating various components and structures that implement the relationship between users controlling vehicles and the vehicles themselves.

Referring now to FIG. 3, there is shown a block diagram depicting some aspects of the role of host device 108 (base station) according to at least one embodiment, and illustrates the components and structures that can be implemented between users 109 controlling vehicles 104 (using controllers 101) and vehicles 104 themselves. FIG. 3 also illustrates some mechanisms by which, in at least one embodiment, users 109 can cooperate to control a vehicle 104, either with other users 109, or assisted by artificial intelligence (AI) planners 305A, 305B running on host device 108, or both. In the example depicted in the Figure, four users 109M through 109Q use controllers 101M through 101Q to control four agents (three vehicles 104M, 104N, 104P and one smart accessory 105). Two AI planners 305A, 105B are provided as well. Between the controllers 101 and the agents 104M, 104N, 104P, 105 are a number of structures operating within the framework of host device 108 (base station). Arrows indicate the direction of information flow.

For illustrative purposes, and for clarity, FIG. 3 does not necessarily describe all structures or the complete flow of information, but rather emphasizes information relevant to vehicle control only. For example, information is shown as traveling in one direction from controllers 101 to filters 301. One skilled in the art will recognize that the control mechanisms described herein can also include the transfer of additional data not depicted in FIG. 3, including data sent from host device 108 to various other components concerning, for example, race performance reporting, sounds, images, animations, and/or other non-control information.

In at least one embodiment, vehicle commands originating from a user 109 are sent via controller 101 to a filter 301; filter 301 can refine the instructions received from controller 101 according to current circumstances concerning the vehicle 104 under the user's 109 control or other aspect of the game. For example, in at least one embodiment, a velocity filter 301 can be implemented. Under normal circumstances, a vehicle 104 can have a permissible range of speeds at which it can travel. A velocity filter 301 can reduce this range by eliminating the upper end of this range, for example if the vehicle 104 had suffered (virtual) damage to it as part of gameplay. Other types of filters 301 can also be provided, so that each vehicle 104 may have a number of different filters 104 affecting different facets of its performance; filters 104 can control or modify such parameters as velocity, lane changing rate, and/or equipment usage (e.g., ammunition in an onboard weapon), and/or the like.

In at least one embodiment, an effects system 302 is provided, which may send input directly related to specific agents 104M, 104N, 104P, 105. Effects system 302 operates as a global actor, having broad capacity to influence vehicle behavior. It may do so in any of several ways. In various embodiments, effects system 302 simulates the potential consequences of interplay of vehicles 104 with one another, as well as external factors that may affect the performance of one or more vehicles 104.

In at least one embodiment, a game engine 303 is provided, which contains rule sets and scenarios, and which generally guides play. Game engine 303 is tightly bound to effects system 302, often triggering effects. Likewise, effects system 302 can inform game engine 303 of events that have initiated actions on its part and which may bear consequence to the course of events as determined by game engine 303. For purposes of clarity, FIG. 3 omits lines connecting users 109 to effects system 302; however, one skilled in the art will recognize that actions taken by users 109 can directly or indirectly trigger effects system 302.

One example of an action directly taken by a user 109 in a modified racing scenario is as follows: in at least one embodiment, a user 109 can deploy a virtual oil slick behind his or her vehicle 104 (more accurately, since the oil slick does not exist in physical space, it is actually deployed behind the vehicle representation 204 in virtual environment 202). A trailing vehicle 104 passing over the virtual oil slick would experience a (presumably temporary) loss of control; this is implemented, for example, by the effects system 302 reducing or eliminating (temporarily) the ability of user 109 controlling the trailing vehicle 104 to steer or to brake.

An example of an indirect trigger to effects system 302 is as follows: in at least one embodiment, if a user 109 crashes his vehicle 104 or that of another user 109 such that, under typical auto racing rules, game engine 303 indicates to effects system 302 that yellow flag conditions are in effect, effects system 302 can put speed limitations into place according to the parameters of the yellow flag conditions. Such limitations may remain in place, for example, until game engine 303 subsequently lifts the yellow flag conditions after the track has been cleared.

In at least one embodiment, as shown in FIG. 3, once the command information has passed beyond filter 301, an arbiter 304 effectively issues the direct instructions to agents, whether vehicles 104 or accessories 105. In at least one embodiment, arbiter 304 optimizes communications directly to the agent or agents 104M, 104N, 104P, 105 to which it is connected. In addition, in some cases, arbiter 304 can share some of filter's 301 role in moderating or altering user commands.

For example, arbiter 304 can serve to reduce or eliminate redundant commands coming from a user 109. Arbiter 304 is also valuable in situations such as that depicted for vehicle 104N, in which two users 109N, 109P and an AI planner 305A are controlling a single vehicle 104N. This is an example of a situation in which more than one user 109 is controlling a vehicle 104. As another example, as described above, a vehicle 104 may be equipped with weapons that permit aiming and firing, with one user 109 controlling vehicle 104 and the second user 109 operating its weapons. In this case, arbiter 304 integrates and sequences the separate command sets appropriate to execute action(s) in agent 104 as desired by the separate users 109.

In another example, a user 109 can pair with an AI planner 305, so that AI planner 305 is the driver and user 109 operates vehicle's 104 weaponry, or vice versa. The capacity to rely on AI planner 305 to assist a user 109 controlling a vehicle 104 offers a number of benefits even in situations where a single user 109 might otherwise have the capability of operating all the systems on a vehicle 104. For example, planner 305 can be relied upon to provide steering or to smartly maneuver around slower opponents on a course, leaving a user 109 to control vehicle's 104 speed. One advantage to designating a portion of control to a planner 305 is that it enables broader participation by beginners or younger competitors who may not have the motor skills necessary to compete against more older or more skilled users 109. In this fashion, planner 305 can provide assistance to users 109 in their control of a vehicle 104, and it may do so in a number of different ways according to the game rules and/or user 109 preference.

In another embodiment, the example of planner 305 assuming steering control of a vehicle 104 can be reversed, such that planner 305 controls velocity while user 109 retains control of steering. In more refined scenarios of a jointly controlled vehicle 104 (or other agent), a user 109 may be comfortable with steering and controlling speed on an open course, but less confident about passing or avoiding obstacles on a crowded course; the system can thus be configured to prompt planner 305 to intercede when passing situations or obstacles requiring active avoidance are encountered.

In at least one embodiment, it may be possible for a single user 109 to control multiple agents 104 (which may include vehicles 104 and/or accessories 105). For example, a user 109 might control one agent 104 while a series of others are configured to follow said agent. In other embodiments, user 109 commands might be duplicated across a number of agents 104 such that they respond in unison (e.g., all changing direction or speed simultaneously). In more complex scenarios, a user 109 may provide higher-level commands to a group of agents 104. In the case of a racing game, for example, multiple vehicles 104 under such control may respond to a user's 109 high-level goal-oriented direction, such as to crash another user's vehicle 104 off the course. Responding to such a command, agents 104 might position themselves around the targeted vehicle 104 so as to surround it partly or fully and together push it off the course. In these cases, there may be sets of actions executed in steps or sequences by multiple agents 104 acting in concert.

In at least one embodiment, whether control of a vehicle 104 is maintained by a single user 109, a single AI planner 305, or held jointly among multiple users 109 or a combination of users 109 and planners 305, arbiter 304 moderates the separate and potentially independent commands intended for vehicle 104, selecting among them and/or sequencing them in its relay to vehicle 104. Numerous aspects of behavior can be imparted to AI planner 305 controlling vehicle 104. For example, in addition to schemes relating to driving control and strategy, AI planners 305 can embody personality characteristics that influence their general behavior. For example, AI planners 305 can simulate aggressive drivers that are inclined toward forcing other vehicles 104 off drivable surface 601 or, alternatively, drivers that avoid conflict and instead focus on navigating a course in avoidance of other users 109. In at least one embodiment, such AI schemes can initiate messages to other users 109 to, for example, taunt other drivers, either in association with particular events occurring on drivable surface 601 or in keeping with an intended character disposition.

In at least one embodiment, some capacity for assistive control resides on vehicles 104 themselves. For example, even without the assistance of host device 108, in at least one embodiment vehicles 104 can have the capacity to maintain their relative lateral position on drivable surface 601 through curves and turns without requiring active steering from a user 109. Likewise, vehicles 104 can have the capacity to moderate their speed throughout a course according to velocities that are prescribed as part of the track identification (for example, encoded in readable form on track segments 602). It is also possible, by the same means of localization through recognition of information encoded on segments 602, for vehicles 104 to determine that they have left the course or are otherwise not on the course by the absence of such information in their field of detection for said information. In such cases, in at least one embodiment, it may still be possible for user 109 to control vehicle 104, though such control can be limited to a subset of the total capabilities of vehicle 104 when localized on drivable surface 601. In some embodiments, vehicle's 104 response to user 109 control may be similar to that of a conventional remote-controlled car.

In other embodiments, host device 108 can control the game in other ways apart from actual gameplay. For example, host device 108 can control various features of vehicles 104 that operate in a physical environment as defined in software. These features can include, for example, performance characteristics and vehicle capabilities. In the ongoing example of a vehicle-based game, for example, a vehicle's acceleration profile, top speed, handling and other physical aspects of its performance can be governed in software rather than dictated by the physical limits that exist for it in the real world. In at least one embodiment, the system takes into account how those definitions bear consequences in gameplay in both physical and virtual spaces.

Differences Among Agents in Virtual Environment

The ability for software algorithms to control significant aspects of an agent's 104 capabilities and behavior presents the opportunity to ascribe differences in said capabilities and behavior across agents 104 with identical hardware. In considering the advantages of consistency in hardware design from a manufacturing simplicity and cost perspective, the benefits of building agents 104 that are identical can be compelling from a business perspective. The described system offers unique advantages in providing the ability to impart some level of distinction among individual agents 104 in a group by controlling those differences through software-based means, while retaining consistency in hardware and thereby saving manufacturing costs.

For example, in the context of agents that are vehicles 104 adapted to compete in a racing or competitive driving environment as described herein, it may be advantageous to manufacture vehicles 104 with identical hardware components, which enabling differences in how vehicles 104 drive, behave, and respond. For instance, one vehicle 104 may be intended to perform like a high-performance sports car while another may be a heavy truck with poor acceleration but high inertia or light-weight compact car with a tight turning radius, and so on. Such differences may or may not be visually suggested by different bodies or covers that fit onto the chassis (but which may be solely cosmetic and, in at least one embodiment, do not physically affect the performance characteristics of the vehicle in any meaningful way). In software, such traits can be ascribed easily to the vehicles 104, so as to implement a system wherein the underlying capacities of the physical agents are identical, while the vehicles 104 perform and respond according to the characteristics ascribed to them in the virtual space.

The symbiotic nature of the fusion of physical and virtual environments 201, 202, as described above, allows the governing dynamics of the intended (simulated) physical differences in vehicles 104 to reside largely or entirely in virtual environment 202. For example, if two vehicles of identical weight and capability are provided in the physical environment, the behavior of those vehicles 104 as ascribed through software can simulate very different characteristics of mass, power, maneuverability, and the like, in the physical world. In at least one embodiment, the system uses the physics of vehicle representations 204 and their interactions in virtual environment 202 to control movement and behavior of vehicles 104 in physical environment 201.

For example, two vehicles 104 having identical or similar physical mobility profiles may be provided, so that their weight, acceleration, maneuvering capabilities and like metrics are the same or comparable one another in the physical world. The primary difference between the vehicles 104 is that, in the virtual environment 202, one is intended to represent an armored tank (slow and very heavy) and the other represents a sedan (fast and light). In at least one embodiment, some visual distinction can be made to physical vehicles 104 to reinforce the difference in the characteristics of the corresponding virtual representations 204; for example, body covers on the chassis can have different markings, designs, and/or colors to reflect the difference in virtual characteristics.

Figure 4:
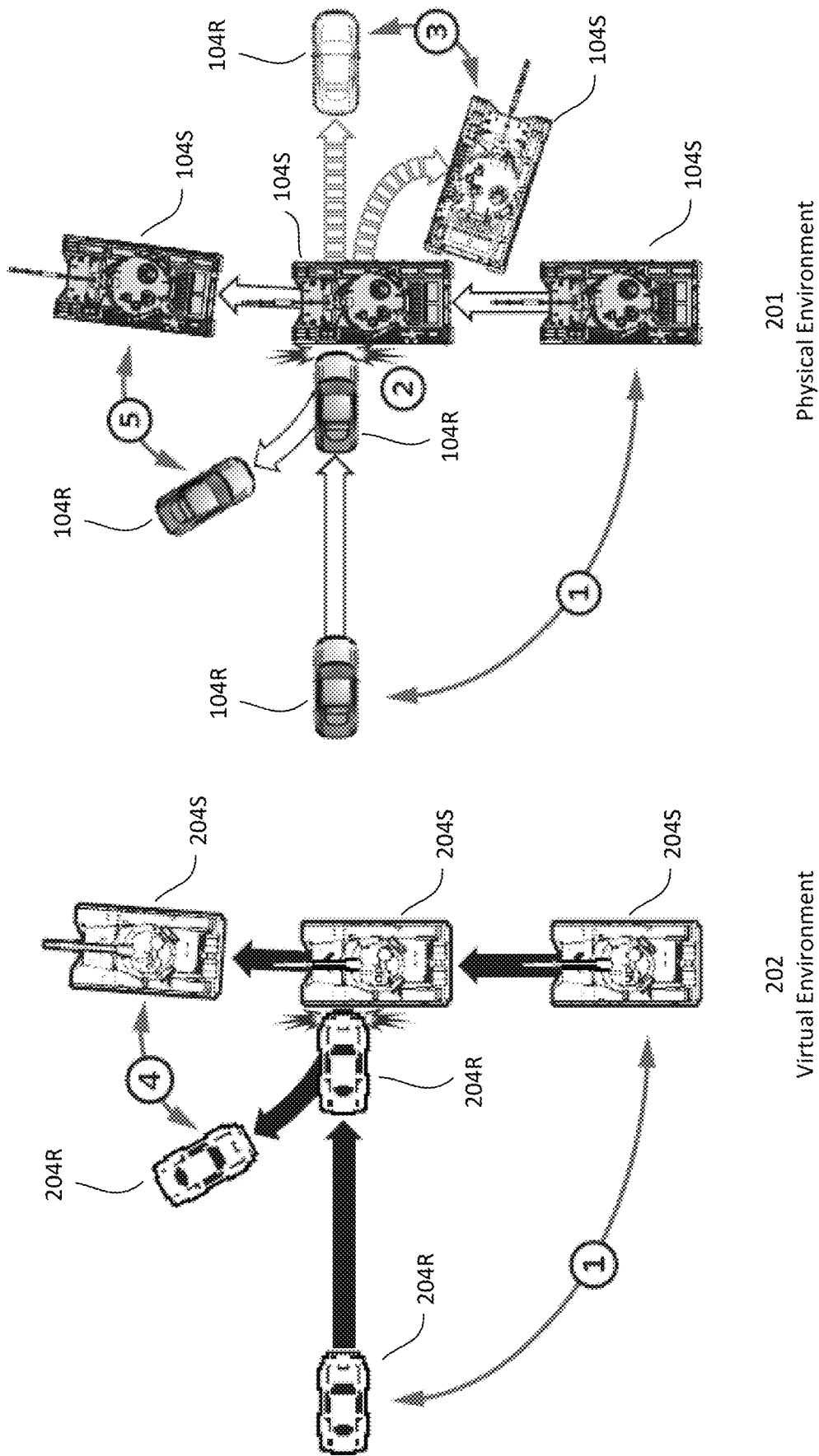
FIG. 4 depicts an example in which body covers on vehicles are used to reflect a difference in characteristics of corresponding representations of the vehicles in a virtual environment, thus reinforcing the relationship between the physical and virtual environments, according to one embodiment.

Referring now to FIG. 4, there is shown an example in which body covers on vehicles 104R, 104S in physical environment 201 are used to reflect a difference in characteristics of corresponding vehicle representations 204R, 204S in virtual environment 202, thus reinforcing the relationship between the physical and virtual environments 201, 202, according to one embodiment. Vehicle 104S is given a cover to make it look like a tank, while vehicle 104R is made to look like a sedan. In at least one embodiment, vehicle representations 204R, 204S are configured to interact with one another in a manner that simulates and reflects the fact that a full-sized, heavily armored vehicle such as a tank may outweigh a full-sized automobile by several times, even though physical vehicles 104R, 104S are, in actuality, comparable in mass and size. While both vehicles 104R, 104S depicted in FIG. 4 would operate in physical environment 201, in order to maintain consistency in their interactions, the governing moving body dynamics in a collision are those defined in virtual environment 202.

In the example of FIG. 4, vehicle 104R (representing a sedan) is traveling at a high speed on a path that causes it to collide with vehicle 104S (representing a tank). As described above, the physical and virtual environments 201, 202 are tightly coupled to one another. Because the mass properties of the two physical vehicles 104R, 104S are identical or closely similar, Newtonian mechanics would dictate that a collision at position 2 would result in an outcome as shown at position 3, in which vehicle 104S (representing the tank) is displaced and rotated and vehicle 104R (representing the sedan) continues traveling on a course similar to its pre-crash heading, albeit at a diminished speed, since the collision involved a transfer of energy to vehicle 104S. However, in at least one embodiment, the system maintains consistency with the properties ascribed to the two vehicles' representations 204R, 204S in virtual environment 202, so that the results of the impact of the two vehicles 104R, 104S in the physical environment 201 are artificially made to follow the physics of the collision in the virtual environment 202. Specifically, since the mass of vehicle representation 204S is significantly larger than that of vehicle representation 204R, the result shown at position 4 results, wherein vehicle representation 204R (the sedan) effectively bounces off of vehicle representation 204S (the tank), while having little effect on the momentum and position of vehicle representation 204S As shown in position 5 of physical environment 201, physical vehicles 104R, 104S are artificially made to follow the trajectories of corresponding vehicle representations 204R, 204S, thus extending the simulation to the physical space.

In essence, then, in an impact between two such vehicles 104, having vehicle representations 204 with such dramatically different mass, vehicle 104R experiences a significantly greater alteration of speed and heading since the inertia of vehicle representation 204S dominates the interaction. If left to the actual physics of the collision between the actual vehicles 104R, 104S, the result would be a collision of equals, with the sedan displacing the tank in a way that would not be realistic considering the mass differences between an automobile and an armored military vehicle. Accordingly, in at least one embodiment, in order to maintain the differences ascribed to the vehicles in virtual space, the consequences of a collision are dictated by the vehicle parameters defined in software and the physics governing interactions in the virtual environment.

Accordingly, in at least one embodiment, the specific details and sequence of events in the collision are determined according to algorithms governing motion in virtual environment 202. In at least one embodiment, coherence is maintained between the physical and virtual environments. One possible approach to enforce such coherence is to allow the algorithms determining the results of the collision in virtual environment 202 to directly influence the control of vehicles 104 in physical environment 201, so as to cause vehicles 104 to move through a collision event in the same (or similar) manner as do vehicle representations 204. In at least one embodiment, the system enforces protocols regarding priority between the virtual and physical environments 202, 201, so as to maintain a desired degree of parity between events happening in virtual environment 202 and those in physical environment 201; in this manner, the system provides bi-directional influence of events, as described above.

Thus, in at least one embodiment, vehicles 104R, 104S in physical environment 201 respond in tandem with their counterparts in virtual environment 202. Vehicles 104R, 104S thereby perform and respond according to parameters defined in virtual environment 202 and according to laws of physics as applied to such parameters in virtual environment 202.

In this particular example, a collision occurs in both the virtual and real environments 202, 201. Since the mass properties assigned to vehicle representations 204 in virtual environment 202 do not match those of physical vehicles 104, the outcome of the collision would be different in the two environments. Here, the operating protocol gave priority to the physics of impact as determined within virtual environment 202; the physical vehicles 104 were made to respond in accordance with those physics. In other situations, however, it might be desirable to give priority to the physics and behaviors of the physical environment 201, and to cause the virtual environment 202 to be adjusted accordingly.

While the example depicted in FIG. 4 describes application of virtual parameters to conventional Newtonian physics, one skilled in the art will recognize that any set of rules can be defined to govern the motion of virtual bodies in collision or any other aspect of movement otherwise dictated by the physics of the real world. Other instances might include, for example, frictionless surfaces in parts of virtual environment 202, causing physical vehicles 104 driving over the corresponding portions of drivable surface 601 to lose the ability to steer or to stop and to drift according to inertia; or simulated inclines where vehicle speed and acceleration capacity is diminished as if ascending even if physical drivable surface 601 remains flat. Virtual forces of numerous types can be introduced arbitrarily and can influence the motion of vehicles 104 differently than would the forces of the real world acting solely according to real-world physics. In this manner, the system can simulate and implement behaviors that do not follow real-world laws of physics, but that may follow other rules.

Error Correction and Track Information

Even in circumstances in which virtual and physical environments 202, 201 are intended to operate as mirrors of each other (i.e., wherein the physics and dynamics are meant to match and separately yield the same results at all times), there may be situations where errors may be introduced, causing disparity between the events in virtual and physical environments 202, 201.

For example, when modeling the motion of vehicle 104 starting to drive around a circular course, the differences between a modeled approach and reality regarding aspects such the vehicle's 104 acceleration, chassis geometry and mass, course adjustment, friction between wheels and drivable surface 601, and the like may introduce errors. Without correction, such errors can compound. Consequently, without protocols to establish and maintain parity between the events occurring in physical environment 201 and those in virtual environment 202, the two will potentially diverge quickly.

In at least one embodiment, the system can be configured to correct for such errors, based on an enforced priority scheme that specifies whether the errors should be corrected in favor of the physical or virtual environments. For example, in at least one embodiment, the system may establish protocols to assure parity is maintained between the physical and the virtual environments. It may be most convenient to understand how these protocols operate to assure parity between the two environments through an examination of the processes governing localization and control of vehicles 104 across both environments.

Considering the base case of a single vehicle 104 on a drivable surface 601, it is entirely likely that, at the outset, vehicle 104 will have no operable information regarding the nature of the track layout or its position on its course. It is also possible that host device 108 which controls the events occurring in virtual environment 202 will have no information regarding drivable surface 601 that vehicle 104 is on or vehicle's 104 current location on it.

In at least one embodiment, means are provided to enable a user 109 to provide track and location information as part of a setup process, either by direct input or through a means that enables host device 108 to determine it, such as a digital photo of drivable surface 601 that includes vehicle 104. In an embodiment that does not enable a user 109 to provide such track information or vehicle position on drivable surface 601 or otherwise provide such information in advance of operation, the information for establishing track and position can be gathered by vehicle 104 itself. Specifically, vehicle 104 can drive along the course for a distance sufficient for it to read the data regarding the identification of a particular segment 602 of drivable surface 601 and the identification of vehicle's 104 location on the segment 602. Once vehicle 104 has obtained this information, the information is communicated to host device 108, which uses it to reference an index of segments 602 to match the unique segment 602 identification to a segment 602 and the location identification. Host device 108 thereby generates an approximation of vehicle's 104 position on drivable surface 601.

Identification of segment 602 by host device 108 further yields a set of data regarding vehicle's 104 operable limits, which may in turn be communicated to vehicle 104. This data may be a combination of localization information (e.g., in the case of a race track, vehicle's 104 position along the track and its horizontal offset from the track's centerline) and data regarding operating limits such as the maximum permissible speeds along various sections of the track or whether turning is permitted at intersections on the track. A benefit of providing such data to vehicle 104 is that it enables vehicle 104 to maintain, at a low level, some ability to operate independently of commands from host device 108, such as maintaining its lateral position on a course and moderating its speed in response to changes in course geometry.

With segment 602 and vehicle 104 position identified, host device 108 can employ a motion model to track vehicle's 104 position on an ongoing basis from the initial state established by vehicle's 104 position in physical space. Recognizing the aforementioned sources of error that yield differences between vehicle's 104 actual position and those predicted by a motion model in virtual environment 202, vehicle 104 in physical environment 201 may provide updates of its location via regular communication with host device 108. The update data may include, for example, current information regarding roadpiece ID and location ID, as well as direct location data such as the precise lateral position of vehicle 104 on the track. Using this data either directly or as inputs to calculations that serve to update virtual environment 202, host device 108 maintains coherence between the movement of vehicle 104 in physical environment 201 and movement of corresponding vehicle representation 204 in virtual environment 202.

In the described embodiment, the motion of physical vehicle 104 takes priority over that of corresponding vehicle representation 204, since the updates are based on the characteristics of motion of physical vehicle 104 and provided to the virtual model. Other embodiments may operate with the reverse protocol. Thus, the motion of virtual vehicle representation 204 may have priority, and the updates can be made to assure that physical vehicle 104 is matching its correspondent's movement. It can be appreciated that such circumstances may include scenarios other than live operation of vehicle 104 or vehicles 104 or even ones in which the events unfolding in virtual environment 202 are based on a model motion. An example might be one in which vehicle movements and interactions in a previously played game are captured and stored for subsequent replay. Even if physical vehicles 104 took priority in the original gameplay, recreating that gameplay in physical environment 201 can involve replaying the recorded events in a virtual form that guides corresponding physical vehicle 104 or vehicles 104.

Intermediate States

In at least one embodiment that maintains a bi-directional influence between virtual and physical environments 202, 201, when differences emerge between the physical and virtual, priority may depend on circumstances and how the assignment of priority in any given situation supports the underlying structure and goals of gameplay. In other embodiments, priority might not be assigned to one side or the other, but rather the system might seek compromise between them in a state that is partly between what one or the other might separately dictate. In such cases, behavior and movement in both virtual and physical environments 202, 201 can be adjusted to conform to the compromise state.

Capture and Storage of Gameplay

In at least one embodiment, the maintenance of two states in parity, one physical and one virtual, allows for capture, storage, distribution, and/or subsequent recreation of gameplay or entire games. The ability for host device 108 to make adjustments to physical environment 201 to match virtual environment 202 (when differences in state emerge and priority is given to virtual environment 202) can also be applied to re-creating past games or running of sequences of play recorded or altogether fabricated and replayed as a progression of events and actions occurring in virtual environment 202 and directly duplicated in physical environment 201. In at least one embodiment, in the re-creation of a recorded game scenario or during the course of a game played live, the action can be accompanied by a commentator providing narration of the events. For example, while the events are occurring in physical environment 201, the coordinated sequences in virtual environment 202 can enable an automated commentator to provide relevant information regarding the changing state of action in gameplay (as well as color commentary).

Virtual Accessory

As described above in connection with FIG. 1, agents 104 can take a number of forms, whether under direct user control or that of an AI planner 305 or some combination thereof. In at least one embodiment, a virtual accessory 106 can be provided, to implement a digitally rendered element in physical space.

Referring now to FIG. 5, there is shown an example of a virtual accessory 106 embodied in a racing and shooting game. In this case, virtual accessory 106 represents an actively aimed and fired gun turret 503. Similar to other agents in the game space, virtual accessory 106 maintains a presence in both the physical and virtual environments 201, 202. For the physical presence, however, a host device provides the rendering of accessory 106. In FIG. 5, the depiction of turret 503 is provided by a tablet 504 (such as an iPad, although any other electronic device can be used), which displays gun turret 503 in the position and in the state corresponding to its presence 501 in virtual environment 202.

In at least one embodiment, wherein agents are vehicles 104 operating on drivable surface 601 printed on a medium, virtual accessory 106 may be integrated into the gameplay through placement of tablet 504 at a designated position and/or orientation marked on the medium. Alternatively, any arbitrary placement may be permitted relative to the physical game space.

In at least one embodiment, a tablet 504 equipped with a back-facing camera can be used to host virtual accessory 106. During placement of tablet 504, the camera can be switched on and recording video. As tablet 504 is positioned, the shifting perspective of the physical game space provides input data from which the tablet's position and orientation relative to the other elements of the game space can be deduced. This approach eliminates restriction on placement of tablet 504 with respect to position and orientation.

In at least one embodiment, the rendering of virtual accessory 106 can be done against a background image of that portion of the printed media it overlays. This may be achieved by host device 108 providing an image of the covered portion of the media directly to tablet 504 or by tablet 504 taking an image of the footprint area beneath it during placement. In the latter case, this approach is useful if the virtual accessory 106 is intended for placement beyond the game space such as that defined by the geometric limits of a printed medium.

The function of a virtual accessory 106 in terms of its integration into gameplay is similar to other agents 104. In the scenario depicted in FIG. 5, vehicle representation 204T passes near gun turret representation 501 in virtual environment 102; correspondingly, physical vehicle 104T passes gun turret 503 rendered on virtual accessory 106 (tablet 504)

in physical environment 201. As vehicle representation 204T passes into the line of fire of gun turret representation 501, gun turret representation 501 discharges, resulting in an impact with vehicle representation 204T. In at least one embodiment, if observed on a device displaying the gameplay in virtual environment 202, the full shot and impact are visible. For observers watching the same action in physical environment 201, rendering of discharge from the turret gun 503 may be limited to the screen of virtual accessory 106, in this case tablet 504. In accordance with the parity maintained between the virtual and physical game environments 202, 201, however, the result of vehicle 104T and vehicle representations 204T being struck would be same, with virtual vehicle representation 204T experiencing damage and, in this instance, a loss of control leading to its veering off course. Corresponding vehicle 104T in physical environment 201 may have the capacity to display the impact through sounds, and/or by illuminating LEDs and/or other means. In addition, vehicle's 104T movement and behavior mirror the resulting loss of control as seen in virtual environment 202.

The above description sets forth the system and method in particular detail with respect to possible embodiments. Those of skill in the art will appreciate that described system and method may be practiced in other embodiments. First, the particular naming of the components, capitalization of terms, the attributes, data structures, or any other programming or structural aspect is not mandatory or significant, and the mechanisms that implement the described system and method or its features may have different names, formats, or protocols. Further, the system may be implemented via a combination of hardware and software, as described, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

In various embodiments, described system and method can be implemented for performing the above-described techniques, either singly or in any combination. In another embodiment, the described techniques can be implemented as a computer program product comprising a nontransitory computer-readable storage medium and computer program code, encoded on the medium, for causing a processor in a computing device or other electronic device to perform the above-described techniques.

Reference in the specification to "one embodiment" or to "an embodiment" means that a particular feature, structure, or characteristic described in connection with the embodiments is included in at least one embodiment. The appearances of the phrase "in at least one embodiment" in various places in the specification are not necessarily all referring to the same embodiment.

Some portions of the above are presented in terms of algorithms and symbolic representations of operations on data bits within a memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects include process steps and instructions described herein in the form of an algorithm. It should be noted that the process steps and instructions can be embodied in software, firmware and/or hardware, and when embodied in software, can be downloaded to reside on and be operated from different platforms used by a variety of operating systems.

The above description also relates to an apparatus for performing the operations herein. This apparatus may be specially constructed for the required purposes, or it may comprise a general-purpose computing device selectively activated or reconfigured by a computer program stored in the computing device. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, flash memory, solid state drives, magnetic or optical cards, application specific integrated circuits (ASICs), or any type of media suitable for storing electronic instructions, and each coupled to a computer system bus. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the techniques are not described with reference to any particular programming language. It will be appreciated that a variety of programming languages may be used to implement the teachings described herein, and any references above to specific languages are provided for disclosure of enablement and best mode.

Accordingly, in various embodiments, the described system can be implemented as software, hardware, and/or other elements for controlling a computer system, computing device, or other electronic device, or any combination or plurality thereof. Such an electronic device can include, for example, a processor, an input device (such as a keyboard, mouse, touchpad, trackpad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or nonportable. Examples of electronic devices that may be used for implementing the described system include: a mobile phone, personal digital assistant, smartphone, kiosk, server computer, enterprise computing device, desktop computer, laptop computer, tablet computer, consumer electronic device, television, set-top box, or the like. An electronic device for implementing the described system may use any operating system such as, for example: Linux; Microsoft Windows, available from Microsoft Corporation of Redmond, Wash.; Mac OS X, available from Apple Inc. of Cupertino, Calif.; iOS, available from Apple Inc. of Cupertino, Calif.; and/or any other operating system that is adapted for use on the device.

While the system has been described with respect to a limited number of embodiments, those skilled in the art, having benefit of the above description, will appreciate that other embodiments may be devised which do not depart from the scope described herein. In addition, it should be noted that the language used in the specification has been principally selected for readability and instructional purposes, and may not have been selected to delineate or circumscribe the inventive subject matter. Accordingly, the above disclosure is intended to be illustrative, but not limiting, of scope, which is set forth in the claims.

What is claimed is:

1. A system comprising:
   a physical agent, configured to:
      receive at least one signal;
      perform at least one action in a physical environment in response to the received at least one signal; and
      transmit at least one signal indicative of the physical state of the physical agent in the physical environment;
   a host device, configured to:
      receive user input for controlling the physical agent,
      receive at least one signal indicative of the physical state of the physical agent;
      transmit at least one signal specifying at least one action to be taken by the physical agent;
      store a virtual representation of the physical agent; and
      maintain substantial parity between the physical state of the physical agent and the state of the corresponding stored virtual representation of the physical agent;
   wherein maintaining substantial parity between the physical state of the physical agent and the state of the corresponding stored virtual representation of the physical agent comprises:
      determining whether there is disparity between the physical state of the physical agent and the state of the corresponding stored virtual representation of the physical agent; and
      responsive to a disparity, automatically reducing the disparity by performing at least one selected from the group consisting of:
         transmitting a signal to the physical agent to change the physical state of the physical agent to reduce the disparity; and
         modifying the stored virtual representation of the physical agent to reduce the disparity.

2. The system of claim 1, wherein the virtual representation of the physical agent is configured for interaction with virtual representations of other objects.

3. The system of claim 1, wherein:
   modifying the stored virtual representation of the physical agent to reduce the disparity comprises:
      adjusting the state of the stored virtual representation based on at least one received signal indicative of the physical state of the physical agent; and
      adjusting the state of the stored virtual representation based on at least one interaction between the virtual representation of the physical agent and at least one virtual representation of another object; and
   transmitting a signal to the physical agent to change the physical state of the physical agent to reduce the disparity comprises transmitting at least one signal to cause the physical agent to change its physical state to comport with the state of the stored virtual representation.

4. The system of claim 1, wherein automatically reducing the disparity comprises:
   adjusting the state of the stored virtual representation based on at least one interaction between the virtual representation of the physical agent and at least one virtual representation of another object; and
   transmitting at least one signal to cause the physical agent to change its physical state to comport with the state of the stored virtual representation.

5. The system of claim 1, wherein automatically reducing the disparity comprises:
   adjusting the state of the stored virtual representation based on at least one received signal indicative of the physical state of the physical agent.

6. The system of claim 1, wherein the physical agent comprises a mobile agent comprising:
   a propulsion mechanism, adapted to impart motive force to the mobile agent;
   a sensor, configured to detect a position of the mobile agent;
   a mobile wireless transceiver, and
   a microcontroller operatively coupled to the propulsion mechanism, the sensor, and the mobile wireless transceiver, the microcontroller configured to control movement of the mobile agent.

7. The system of claim 6, further comprising:
   a drivable surface having a plurality of machine-readable codes indicating locations on the surface;
   wherein the mobile agent comprises a vehicle configured to travel along the drivable surface, and wherein the sensor of the mobile agent detecting a position of the mobile agent comprises the sensor detecting the machine-readable codes as the vehicle travels along the surface.

8. The system of claim 1, wherein the host device comprises a wireless transceiver, and wherein:
   the host device receiving at least one signal comprises the wireless transceiver receiving at least one signal; and
   the host device transmitting at least one signal comprises the wireless transceiver transmitting at least one signal.

9. The system of claim 1, wherein the host device comprises at least one selected from the group consisting of:
   a mobile computing device;
   a smartphone;
   a tablet computer;
   a desktop computer;
   a laptop computer;
   a video game console; and
   a kiosk.

10. The system of claim 1, further comprising:
an accessory, positionable within the physical environment;
wherein the host device stores a virtual representation of the accessory, and wherein the accessory is configured to affect a state of the virtual representation of the physical agent;
and wherein, responsive to an interaction between the virtual representation of the physical agent and the virtual representation of the accessory, the host device transmits a signal to cause the physical agent to change its physical state to reflect the result of the interaction.

11. The system of claim 1, further comprising:
a mobile computing device, positionable within the physical environment and configured to display a dynamic representation of an accessory agent;
wherein the host device stores a virtual representation of the accessory agent, and wherein the virtual representation of the accessory agent is configured for interaction with the virtual representations of the physical agent;
and wherein, responsive to an interaction between the virtual representation of the accessory agent and the virtual representation of the physical agent, the host device transmits a signal to cause the physical agent to change its physical state to reflect the result of the interaction.

12. The system of claim 11, wherein the host device is configured to receive user input for controlling the accessory agent, and further configured to transmit at least one signal for controlling the accessory agent;
and wherein the host device adjusts the state of the stored virtual representation of the accessory agent responsive to receiving a signal for controlling the accessory agent.

13. The system of claim 12, wherein the accessory agent comprises a weapon, and wherein the virtual representation of the accessory agent is configured for firing upon the virtual representation of the physical agent.

14. The system of claim 1, further comprising:
an automated computing system, configured to control the physical agent in an automated manner;
wherein the physical agent is configured to receive at least one signal from the automated computing system and to perform actions in the physical environment in response to the received at least one signal, the physical agent being configured for interaction with other objects not controlled by the automated computing system.

15. The system of claim 1, wherein the host device transmitting at least one signal specifying at least one action to be taken by the physical agent comprises the host device transmitting at least one signal over the Internet.

16. The system of claim 1, further comprising:
at least one display device, configured to receive signals from the host device indicating the state of the virtual representation of the physical agent, and further configured to display a dynamic representation of the physical agent based on the received signals.

17. The system of claim 1, wherein:
determining whether there is disparity comprises receiving a signal from the physical agent indicating a position; and
automatically reducing the disparity comprises adjusting the position of the stored virtual representation of the physical agent to comport with the indicated position of the physical agent.

18. A method for using a mobile computing device to control a physical agent, the method comprising, at a host device, performing the steps of:
receiving at least one signal indicative of the physical state of the physical agent in a physical environment;
transmitting at least one signal specifying at least one physical action to be taken by the physical agent in the physical environment;
storing a virtual representation of the physical agent; and
maintaining substantial parity between the physical state of the physical agent and the state of the corresponding stored virtual representation of the physical agent;
wherein the physical agent is further configured to perform at least one physical action in response to at least one signal received from the host device;
and wherein maintaining substantial parity between the physical state of the physical agent and the state of the corresponding stored virtual representation of the physical agent comprises:
determining whether there is disparity between the physical state of the physical agent and the state of the corresponding stored virtual representation of the physical agent; and
responsive to a disparity, automatically reducing the disparity by performing at least one selected from the group consisting of:
transmitting a signal to the physical agent to change the physical state of the physical agent to reduce the disparity; and
modifying the stored virtual representation of the physical agent to reduce the disparity.

19. The method of claim 18, wherein the virtual representation of the physical agent is configured for interaction with virtual representations of other objects.

20. The method of claim 18, wherein:
modifying the stored virtual representation of the physical agent to reduce the disparity comprises:
adjusting the state of the stored virtual representation based on at least one received signal indicative of the physical state of the physical agent; and
adjusting the state of the stored virtual representation based on at least one interaction between the virtual representation of the physical agent and at least one virtual representation of another object; and
transmitting a signal to the physical agent to change the physical state of the physical agent to reduce the disparity comprises transmitting at least one signal to cause the physical agent to change its physical state to comport with the state of the stored virtual representation.

21. The method of claim 18, wherein automatically reducing the disparity comprises:
adjusting the state of the stored virtual representation based on at least one interaction between the virtual representation of the physical agent and at least one virtual representation of another object; and
transmitting at least one signal to cause the physical agent to change its physical state to comport with the state of the stored virtual representation.

22. The method of claim 18, wherein automatically reducing the disparity comprises:
adjusting the state of the stored virtual representation based on at least one received signal indicative of the physical state of the physical agent.

23. A non-transitory computer-readable medium for using a mobile computing device to control a physical agent, comprising instructions stored thereon, that when executed by one or more processors at a host device, perform the steps of:

receiving at least one signal indicative of the physical state of the physical agent in a physical environment;

transmitting at least one signal specifying at least one physical action to be taken by the physical agent in the physical environment;

storing a virtual representation of the physical agent; and maintaining substantial parity between the physical state of the physical agent and the state of the corresponding stored virtual representation of the physical agent;

wherein the physical agent is further configured to perform at least one physical action in response to at least one signal received from the host device;

and wherein maintaining substantial parity between the physical state of the physical agent and the state of the corresponding stored virtual representation of the physical agent comprises:

determining whether there is disparity between the physical state of the physical agent and the state of the corresponding stored virtual representation of the physical agent; and responsive to a disparity, automatically reducing the disparity by performing at least one selected from the group consisting of:

transmitting a signal to the physical agent to change the physical state of the physical agent to reduce the disparity; and modifying the stored virtual representation of the physical agent to reduce the disparity.

24. The non-transitory computer-readable medium of claim 23, wherein the virtual representation of the physical agent is configured for interaction with virtual representations of other objects.

25. The non-transitory computer-readable medium of claim 23, wherein:

modifying the stored virtual representation of the physical agent to reduce the disparity comprises:

adjusting the state of the stored virtual representation based on at least one received signal indicative of the physical state of the physical agent; and adjusting the state of the stored virtual representation based on at least one interaction between the virtual representation of the physical agent and at least one virtual representation of another object; and transmitting a signal to the physical agent to change the physical state of the physical agent to reduce the disparity comprises transmitting at least one signal to cause the physical agent to change its physical state to comport with the state of the stored virtual representation.

26. The non-transitory computer-readable medium of claim 23, wherein automatically reducing the disparity comprises:

adjusting the state of the stored virtual representation based on at least one interaction between the virtual representation of the physical agent and at least one virtual representation of another object; and transmitting at least one signal to cause the physical agent to change its physical state to comport with the state of the stored virtual representation.

27. The non-transitory computer-readable medium of claim 23, wherein automatically reducing the disparity comprises:

adjusting the state of the stored virtual representation based on at least one received signal indicative of the physical state of the physical agent.

* * * * *